(12) United States Patent
Kikuiri

(10) Patent No.: US 6,741,430 B2
(45) Date of Patent: May 25, 2004

(54) THIN-FILM MAGNETIC HEAD WITH LESS SMEARING

(75) Inventor: Katsuya Kikuiri, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 262 days.

(21) Appl. No.: 09/815,676

(22) Filed: Mar. 23, 2001

(65) Prior Publication Data

US 2001/0028539 A1 Oct. 11, 2001

(30) Foreign Application Priority Data

Mar. 28, 2000 (JP) ........................................ 2000-089815

(51) Int. Cl.[7] ............................................... G11B 5/127
(52) U.S. Cl. ...................................................... 360/320
(58) Field of Search ................................ 360/320, 126, 360/324.1, 317, 324.11, 119, 313, 318, 319, 327.32; 324/252

(56) References Cited

U.S. PATENT DOCUMENTS

| 5,084,794 A | | 1/1992 | Smith | |
|---|---|---|---|---|
| 5,193,038 A | | 3/1993 | Smith | |
| 5,357,388 A | | 10/1994 | Smith | |
| 5,603,156 A | | 2/1997 | Biskeborn et al. | |
| 5,695,657 A | * | 12/1997 | Shibata et al. | 360/313 |
| 5,701,221 A | * | 12/1997 | Taniyama et al. | 360/313 |
| 5,735,036 A | | 4/1998 | Barr et al. | |
| 5,897,969 A | * | 4/1999 | Taniyama et al. | 428/692 |
| 6,157,523 A | * | 12/2000 | Kikuchi et al. | 360/324.11 |
| 6,297,938 B1 | * | 10/2001 | Niijima | 360/317 |
| 6,341,052 B2 | * | 1/2002 | Hayashi | 360/324.1 |
| 6,504,687 B1 | * | 1/2003 | Miyatake et al. | 360/319 |
| 6,515,837 B1 | * | 2/2003 | Hamakawa et al. | 360/319 |
| 6,563,677 B2 | * | 5/2003 | Narumi et al. | 360/319 |

FOREIGN PATENT DOCUMENTS

JP 2000-182223 6/2000

* cited by examiner

*Primary Examiner*—Allen Cao
(74) *Attorney, Agent, or Firm*—Brinks Hofer Gilson & Lione

(57) ABSTRACT

First and second embodiments of thin-film magnetic heads each including a magnetoresistive element for reading out information as a result of moving relative to a magnetic recording medium. Each thin-film magnetic head includes a base, a lower shield layer that is formed on the base, a lower insulating layer, the magnetoresistive element, an upper insulating layer which is formed on the magnetoresistive element, and an upper shield layer. In order to make uniform the separation between each upper shield layer and its corresponding lower shield layer in the vicinity of its corresponding magnetoresistive element, a middle insulating layer is formed in the same film plane as its corresponding magnetoresistive element.

16 Claims, 20 Drawing Sheets

FIG. 11
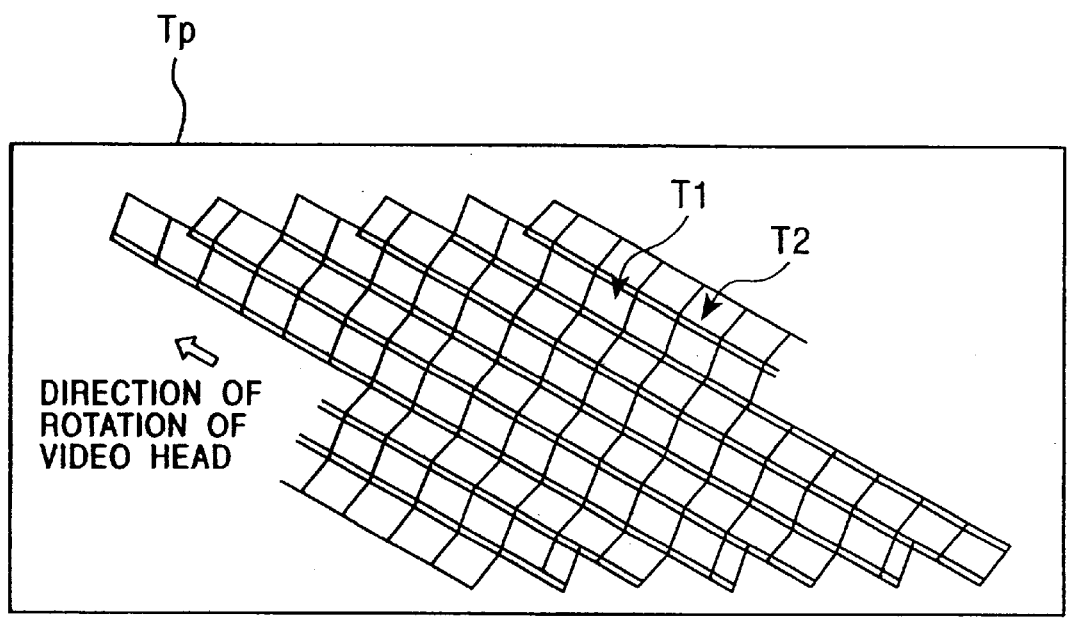
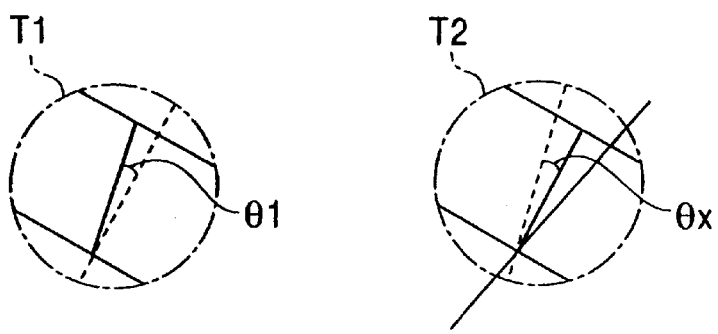

THIN-FILM MAGNETIC HEAD WITH LESS SMEARING

BACKGROUND OF THE INVENTION

1. Field of the Invention

The present invention relates to a thin-film magnetic head, and, more particularly, to a technology which is suitable for preventing smearing of a surface of the thin-film magnetic head which slides with respect to a medium or a surface of the thin-film magnetic head which opposes the medium, and which is suitable for preventing smearing in a lapping process in a method of producing the thin-film magnetic head.

2. Description of the Related Art

Since, in thin-film magnetic heads having a magnetoresistive element, tracks can be made even more narrower than those in conventional bulk-type magnetic heads, thin-film magnetic heads are used in various forms, such as sliding magnetic heads which are constructed so as to slide relative to a tape having a high recording density, and flying magnetic heads which move relative to a magnetic disk while they are separated therefrom.

A sliding magnetic head which has a conventional thin-film magnetic head structure will be described with reference to FIGS. 19 to 23.

FIG. 19 is a perspective view of a conventional sliding magnetic head. FIG. 20 is a schematic plan view of a main portion of the sliding magnetic head as viewed from a side of a surface of the sliding magnetic head opposing a medium. FIG. 21 is a sectional view taken along line XXI—XXI of FIG. 20. FIG. 22 is an enlarged plan view of an MR element 105 shown in FIG. 20 and the vicinity thereof.

A sliding magnetic head B shown in FIG. 19 is formed in the following way. Side end surfaces of block-shaped core bases 202 and 203 are adhered together through a core-incorporated layer 205 to form an integral structure which is block-shaped as a whole. Then, one of the side surfaces of each of the core bases 202 and 203 (which are adhered together) are adhered and secured to a base plate 201 so that one side of each of the core bases 202 and 203 protrudes slightly outwardly from an end of the base plate 201.

One surface of the sliding magnetic head B protruding outwardly from the base plate 201 is formed into a protruding, curved shape. As shown by the phantom lines in FIG. 19, this surface is formed as a surface 206 which slides with respect to a magnetic recording medium such as a magnetic tape.

As shown in FIGS. 20 and 21, a write head (hereinafter referred to as "inductive head") 210 used to perform a recording operation and a thin-film magnetic read head 211 which includes a magnetoresistive element are incorporated in the core-incorporated layer 205.

The thin-film magnetic read head 211 is formed by successively placing upon the core base 202 a lower shield layer 101, a lower insulating layer 104, a magnetoresistive (MR) element 105, an upper insulating layer 106, and an upper shield layer 107.

As shown in FIG. 20, ends of the lower shield layer 101, the lower insulating layer 104, the MR element 105, the upper insulating layer 106, and the upper shield layer 107 are exposed at the surface 206.

Here, a read magnetic gap G is formed by the lower insulating layer 104 and the upper insulating layer 106. The upper shield layer 107 and the lower shield layer 101 are formed of, for example, an alloy of nickel and iron, and the upper insulating layer 106 and the lower insulating layer 104 are formed of, for example, $Al_2O_3$.

In the structures shown in FIGS. 20 and 21, the upper shield layer 107 is also a lower core layer of the inductive head 210 which is formed thereabove. A write gap layer 110 is formed above the lower core layer (or the upper shield layer) 107. A coil layer 111 which is formed into a pattern so as to form a spiral in a plane is formed on the write gap layer 110, and is surrounded by a coil insulating layer 112. On the surface 206, an end 113a of an upper core layer 113 formed on the coil insulating layer 112 opposes the lower core layer 107 through the write insulating layer 110 so as to be separated by a very small distance from the lower core layer 107. A base end 113b of the upper core layer 113 is magnetically connected to the lower core layer 107. A protective layer 116 is formed on the upper core layer 113. In FIG. 21, reference numeral 108 denotes a detecting electrode which is connected to the MR element 105. The electrode 108 is wired on both sides of the MR element 105.

More specifically, as shown in FIG. 22, the MR element 105 comprises a magnetoresistive film (MR film) 105a and bias layers 105b and 105b. The MR film 105a is used to read out magnetically recorded data from a medium by the magnetoresistive effect. The bias layers 105b and 105b are provided on both the left and right sides of the magnetoresistive film 105a so as to cover ends of the magnetoresistive film 105a.

Edges 105c and 105c are formed on both sides of the MR element 105. Therefore, as shown in FIG. 22, the thickness of the upper insulating layer 106 is $S_1$, but the thickness of the portions of the upper insulating layer 106 corresponding to the locations of these edges 105c and 105c are $S_2$, which are smaller than $S_1$.

When the sliding magnetic head B slides with respect to a medium, such as a magnetic tape, which moves in the direction of arrow $T_1$ shown in FIG. 22, magnetically recorded data is read out from the medium. When a guard bandless recording operation is carried out using a helical scanning type magnetic recording/reproducing device, what is called an azimuthal recording/reproducing operation (which is carried out by tilting a magnetic gap by a predetermined angle (that is, an azimuthal angle in the widthwise direction of a track) is carried out. Therefore, the medium, such as a magnetic tape, moves in the direction of arrow $T_2$ shown in FIG. 22.

The sliding magnetic head B is produced, for example, in the following way.

Using a technique for forming a thin layer, the thin-film magnetic head 211 (which comprises the MR element 105) and the inductive head 210 are successively formed on the core base 202 in order to form the core-incorporated layer 205.

Here, as shown in FIG. 23, a method of producing the MR element 105 and the vicinity thereof is carried out to form the lower insulating layer 104, bias layers 105b' and 105b', and MR films 105a' and 105a" on the lower shield layer 101. A pattern, such as a resist pattern, is used to cover the bias layers 105b' and 105b' and the MR films 105a' and 105a". After removing the MR film 105a" and part of the bias layers 105b' and 105b' by milling, the upper insulating layer 106 is placed thereon, as shown in FIG. 22. Here, the MR film 105a" is completely removed by use of ion milling process, so that the bias layers 105b' and 105b' are formed with the corresponding edges 105c, as shown in FIG. 22.

A different core base, that is, the core base 203 is joined to the core-incorporated layer 205 in order to form a core block. One surface of the core block is lapped by, for example, a lapping tape which has diamond grains distributed thereon in order to process the protruding, curved shaped surface 206, whereby the sliding magnetic head B is formed.

Even non-contact, flying magnetic heads used with, for example, hard disks, are constructed so as to include an MR element such as that described above. Accordingly, even in producing such flying magnetic heads, the lapping process is carried out after the formation of the MR element. In the lapping process, a lapping tape, such as that described above, is used in order to lap the surface of the magnetic head which faces the magnetic recording medium.

However, in the sliding magnetic head B, the upper shield layer 107 and the lower shield layer 101 which sandwich the upper insulating layer 106 and the lower insulating layer 104 are formed of an alloy of nickel and iron which has relatively low hardness. Therefore, when the core block is lapped with a lapping tape, the lapping surfaces of the upper and lower shield layers 107 and 101 are stretched like candy by the lapping tape, so that, as shown in FIG. 20, tongue-shaped drooping portions D may be formed.

These tongue-shaped drooping portions D may, for example, reach the MR element 105 from the upper shield layer 107 or the lower shield layer 101, causing shorting of the upper shield layer 107 and the MR element 105 or the lower shield layer 101 and the MR element 105, that is, causing what is called smearing to occur.

Even when reproducing magnetically recorded data by sliding the magnetic tape or the like relative to the sliding magnetic head B, the surface 206 of the head is lapped by the magnetic tape. Therefore, as described above, portions of the shield layers 101 and 107 get stretched like candy, causing the drooping portions D to be formed, so that shorting occurs. In other words, smearing may occur.

When carrying out an azimuthal recording/reproducing operation by the aforementioned helical scanning (in which a magnetic gap is tilted by an azimuthal angle), as shown in FIG. 22, the portions of the upper insulating layer 106 corresponding to the edges 105c of the MR element 105 are thin with the thicknesses of $S_2$, making it more likely for smearing to occur at these portions.

Moreover, in recent years, in order to respond to the demand of higher magnetic recording density, the separation between the upper and lower shield layers 107 and 101, that is, the size of the magnetic gap G needs to be made small, so that there is a tendency to form the upper and lower insulating layers 106 and 104 with an even smaller thickness. In this case, even the formation of a small drooping portion easily causes shorting of the upper shield layer 107 and the MR element 105 and the lower shield layer 101 and the MR element 105, so that it is even more likely for smearing to occur.

Even non-contact, flying magnetic heads used with, for example, hard disks are constructed so as to include an MR element such as that described above. Therefore, when an MR element is lapped in the lapping process which is carried out when producing non-contact, flying magnetic heads, smearing may occur.

SUMMARY OF THE INVENTION

In view of the above-described problems, it is an object of the prevent invention to make it possible to achieve at least one of the following:

1) To reduce the occurrence of smearing in a sliding thin-film magnetic head;
2) To reduce the occurrence of smearing that occurs when carrying out an azimuthal recording/reproducing operation by helical scanning; and
3) To reduce the occurrence of smearing in a lapping process which is carried out in producing flying thin-film magnetic heads.

To this end, according to a first aspect of the present invention, there is provided a thin-film magnetic head including a magnetoresistive element for reading out information as a result of sliding relative to a magnetic recording medium. The thin-film magnetic head comprises a base, a lower shield layer that is formed on the base, a lower insulating layer that is formed on the lower shield layer, the magnetoresistive element that is formed on the lower insulating layer, an upper insulating layer that is formed on the magnetoresistive element, and an upper shield layer. In the thin-film magnetic head, on a surface that slides with respect to the medium, the magnetoresistive element is disposed in a sandwiched state between the upper insulating layer and the lower insulating layer. In addition, a middle insulating layer is formed on both sides of the magnetoresistive element in a widthwise direction thereof so as to be positioned in a same film plane as the magnetoresistive element.

The magnetoresistive element may comprise a magnetoresistive film and a bias layer, the bias layer being positioned on both sides of the magnetoresistive film, on the surface which slides with respect to the medium, and being directly connected to the magnetoresistive film. In addition, the bias layer and the middle insulating layer may be connected together on the surface which slides with respect to the medium.

According to a second aspect of the present invention, there is provided a thin-film magnetic head including a magnetoresistive element for reading out information as a result of moving relative to a magnetic recording medium. The thin-film magnetic head comprises a base, a lower shield layer which is formed on the base, a lower insulating layer which is formed on the lower shield layer, the magnetoresistive element that is formed on the lower insulating layer, an upper insulating layer that is formed on the magnetoresistive element, and an upper shield layer. In the thin-film magnetic head, on a surface which opposes the medium, the magnetoresistive element is disposed in a sandwiched state between the upper insulating layer and the lower insulating layer. In addition, a middle insulating layer is formed on both sides of the magnetoresistive element in a widthwise direction thereof so as to be positioned in a same film plane as the magnetoresistive element.

The magnetoresistive element may comprise a magnetoresistive film and a bias layer, the bias layer being positioned on both sides of the magnetoresistive film, at the surface that opposes the medium, and being directly connected to the magnetoresistive film. In addition, the bias layer and the middle insulating layer may be connected together at the surface which opposes the medium.

According to the present invention, there is provided a thin-film magnetic head including a magnetoresistive element for reading out information as a result of sliding or moving relative to a magnetic recording medium. The thin-film magnetic head comprises a base, a lower shield layer that is formed on the base, a lower insulating layer, the magnetoresistive element, an upper insulating layer that is formed on the magnetoresistive element, and an upper shield layer. In the thin-film magnetic head, in order to make the separation distance between the upper shield layer and the lower shield layer uniform in the vicinity of the magnetoresistive element, a middle insulating layer is formed in a same film plane as the magnetoresistive element.

In the present invention, the magnetoresistive element may comprise a magnetoresistive film and a bias layer. The bias layer is positioned on both sides of the magnetoresistive film in contact therewith. The bias layer is connected to the middle insulating layer.

In the present invention, by forming the middle insulating layer in the same film plane as the magnetoresistive element, the upper insulating layer can be substantially uniformly placed along the vicinity of a portion from the middle insulating layer to the magnetoresistive element. Therefore, on the surface of the magnetic head that slides with respect to a medium or the surface of the magnetic head that opposes the medium, the thicknesses of the insulating layers between the upper shield layer and the lower shield layer can be made uniform in the vicinity of the magnetoresistive element. Consequently, even in the case where a magnetic head that performs an azimuthal recording/reproducing operation by helical scanning (in which the aforementioned azimuthal angle is provided) is used, the separation between the upper shield layer and the magnetoresistive element and the separation distance between the lower shield layer and the magnetoresistive element can be properly set. Accordingly, it is possible to reduce the tendency with which smearing occurs due to the azimuthal angle when the shield layers are stretched by the sliding of the head and the magnetic recording medium, such as a tape, relative to each other.

Accordingly, even if the separation between the upper shield layer and the lower shield layer, that is, the size of the magnetic gap is made small, it is possible to reduce the occurrence of smearing.

In the present invention, by joining the middle insulating layer to the edges of the bias layer, the boundaries between the magnetoresistive film, the bias layer, the middle insulating layer, and the upper insulating layer can be made smooth, so that the thickness of the upper insulating layer can be set substantially constant. This makes it possible to smoothly form the upper shield layer in the vicinity of the portion where the magnetoresistive film, the bias layer, and the middle insulating layer are joined together. Therefore, even when a magnetic head which performs an azimuthal recording/reproducing operation by helical scanning where the aforementioned azimuthal angle is provided is used, the separation distance between the upper shield layer and the magnetoresistive element and that between the lower shield layer and the magnetoresistive element can be separated by proper distances. Accordingly, it is possible to reduce the tendency with which smearing occurs due to the azimuthal angle when the shield layers are stretched by the sliding of the head and the recording medium, such as a tape, with respect to each other.

By virtue of each of these structures, the separation distance between the upper shield layer and the magnetoresistive element and that between the lower shield layer and the magnetoresistive element can be properly set. Consequently, it is possible to reduce the occurrence of smearing in the lapping step that is carried out to produce a sliding thin-film magnetic head or a flying thin-film magnetic head.

BRIEF DESCRIPTION OF THE DRAWINGS

FIG. 11 is a schematic view used to illustrate the recording operation to a magnetic tape using the rotary head shown in FIG. 9.

DESCRIPTION OF THE PREFERRED EMBODIMENTS

Hereunder, a description of a first embodiment of a thin-film magnetic head of the present invention will be given with reference to the relevant drawings.

(First Embodiment)

Figure 1:
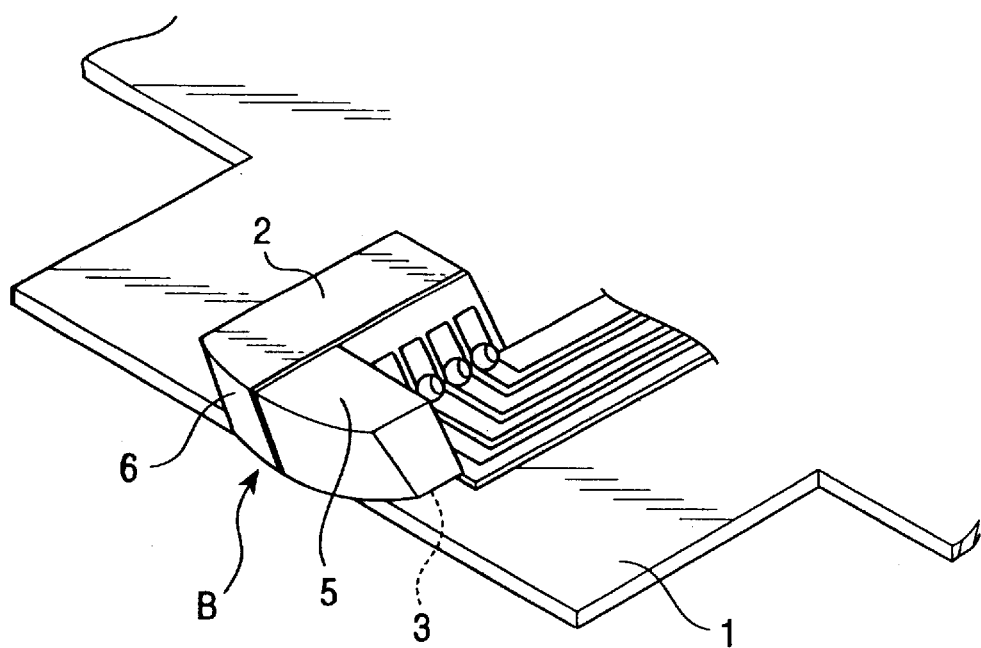
FIG. 1 is a perspective view of a first embodiment of a thin-film magnetic head in accordance with the present invention which is mounted to a base plate 1 of a magnetic recording device.
Figure 2:
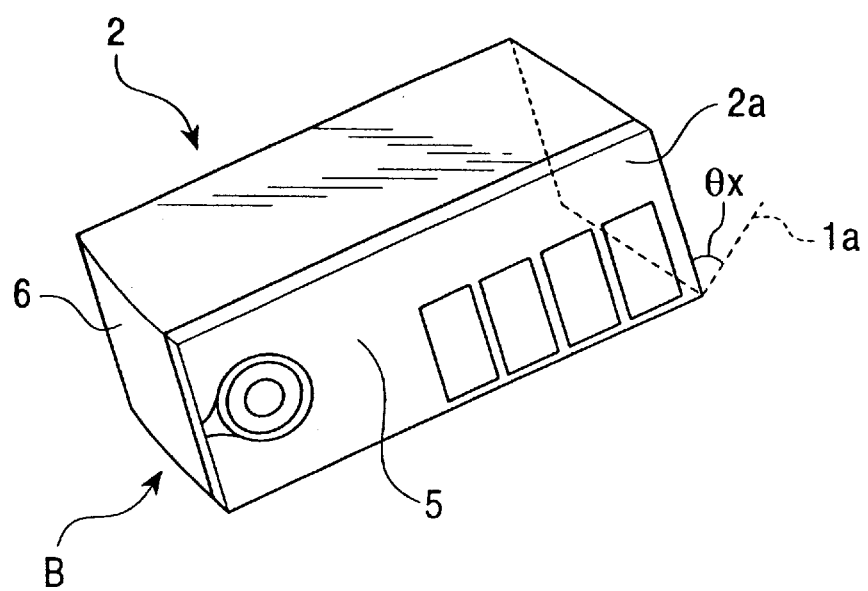
FIG. 2 is a perspective view of the main portion of the thin-film magnetic head shown in FIG. 1.
Figure 3:
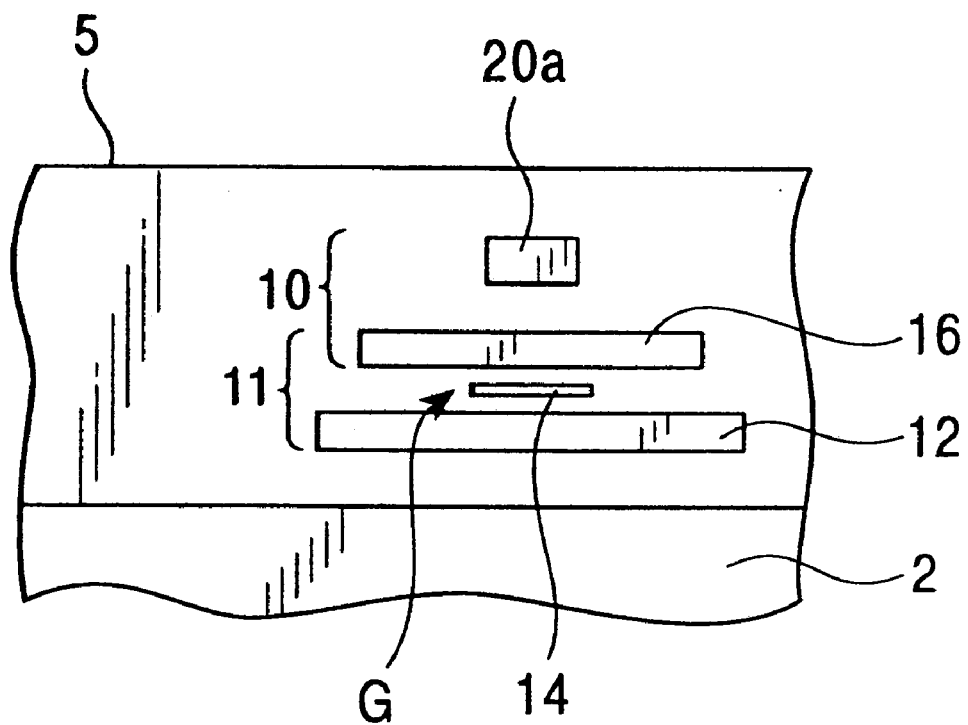
FIG. 3 is a schematic front view of the main portion of the thin-film magnetic head shown in FIG. 2, as viewed from a surface of the thin-film magnetic head which slides with respect to a medium.
Figure 4:
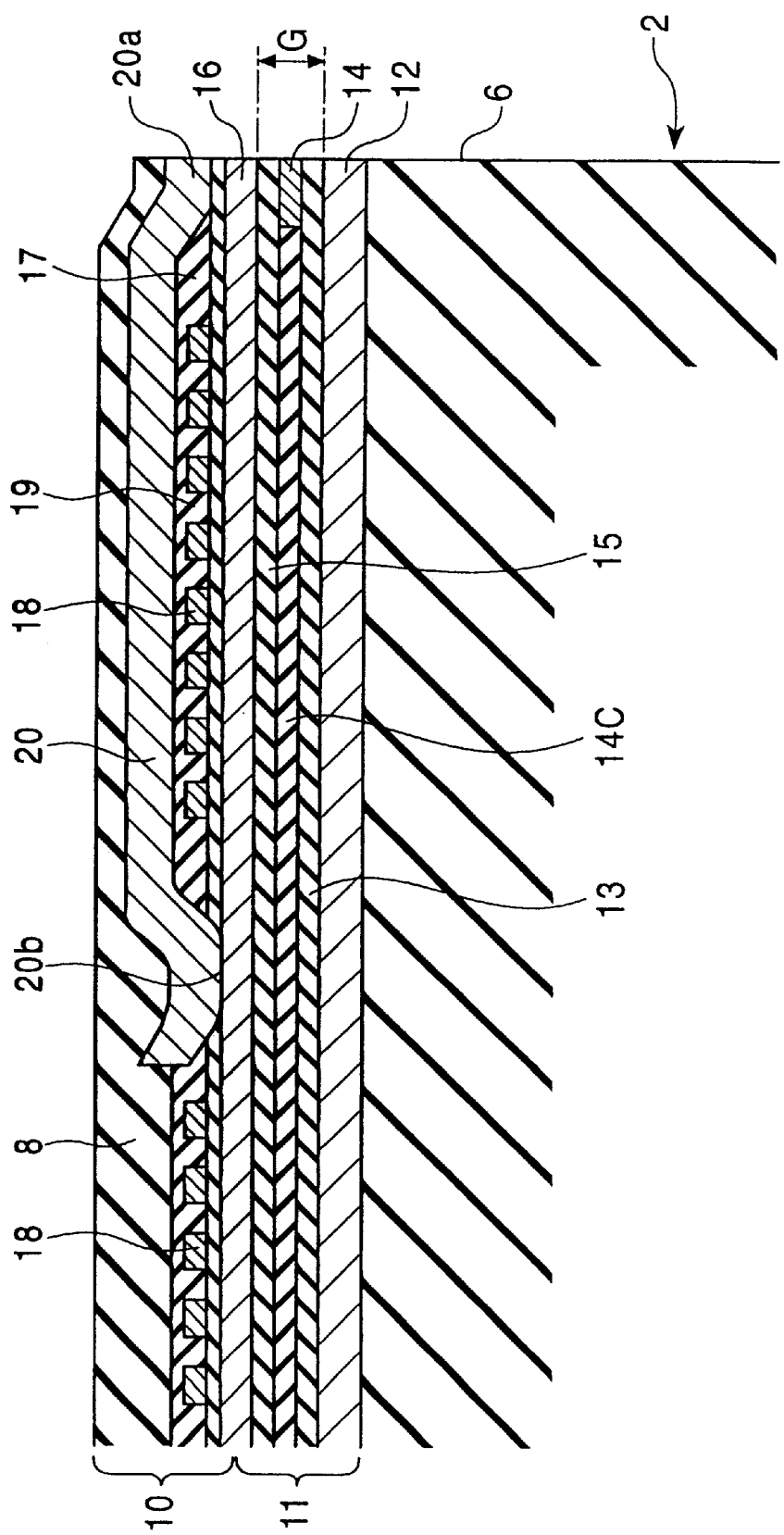
FIG. 4 is a cross-sectional view of the main portion of the thin-film magnetic head shown in FIG. 3.

FIG. 1 is a perspective view of a first embodiment of a thin-film magnetic head of the present invention which is mounted on a base plate 1 of a magnetic recording device. FIG. 2 is a perspective view of the main portion of the thin-film magnetic head shown in FIG. 1. FIG. 3 is a schematic front view of the main portion of the thin-film magnetic head shown in FIG. 2, as viewed from a surface of the thin-film magnetic head which slides with respect to a medium. FIG. 4 is a cross-sectional view of the main portion of the thin-film magnetic head shown in FIG. 3.

As shown in FIG. 1, a thin-film magnetic head B of the embodiment is formed in the following way. Side end surfaces of block-shaped core bases 2 and 3 are adhered together through a core-incorporated layer 5 in order to form an integral structure which is block-shaped as a whole. One of the side surfaces of each of the core bases 2 and 3 (which are adhered together) are adhered and secured to the top surface of a base plate 1 so that one side of each of the core bases 2 and 3 protrudes slightly outwardly from an end of the base plate 1.

The core bases 2 and 3 are formed of, for example, ferrite or ceramic material having excellent wear resistance such as $CaTiO_3$ or $Al_2O_3$—TiC, or the like.

As shown in FIGS. 1 and 2, the core base 2 has the shape of a square-column in which a sectional plane, which is orthogonal to the longitudinal direction thereof is in the shape of a parallelogram. As described later, the inside angle which is formed between a side surface 2a of a read head 11 (shown in FIG. 4) and a normal line 1a of the base plate 1 (that is, the inside angle of the parallelogram in the square-column-shaped sectional plane) is formed so as to become an azimuthal angle θx.

As shown in FIG. 1, one surface of the thin-film magnetic head B which protrudes outwardly from the base plate 1 is processed into a protruding, curved shape. This processed surface is formed as a surface 6 which slides with respect to a magnetic recording medium such as a magnetic tape.

As shown in FIGS. 3 and 4, a write head (that is, an inductive head) 10 and a read head (that is, a magnetoresistive (MR) head) 11 is incorporated in the core-incorporated layer 5 which is provided at the center portion of the surface 6.

As shown in FIGS. 3 and 4, in the MR head 11, a lower gap layer (that is, a lower insulating layer) 13 is formed on top of a lower shield layer 12 which is disposed on a side surface of the core base 2. The lower shield layer 12 is formed of a magnetic alloy, such as permalloy (an alloy of iron and nickel) or Sendust (an alloy of iron, aluminum, and silicon). The lower gap layer 13 is formed of a nonmagnetic material such as alumina ($Al_2O_3$).

A magnetoresistive element 14 is placed upon the portion of the gap layer 13 at the side of the surface 6, whereas a middle insulating layer 14C is placed upon the other portions of the gap layer 13. An upper gap layer (that is, an upper insulating layer) 15 and an upper shield layer 16 are formed in that order on top of the magnetoresistive element 14 and the middle insulating layer 14C. A read magnetic gap G is disposed between the upper shield layer 16 and the lower shield layer 12. The upper shield layer 16 is also a lower core layer of a write head 10 disposed thereabove.

In the write head 10, a gap layer 17 is formed on top of the lower core layer 16 which is also the upper shield layer, and a thin-film coil section 18 is formed on top of the gap layer 17. The coil portion 18 is patterned so as to be annular and spiral in a plane. Part of the thin-film coil section 18 is surrounded by an insulating layer 19. A magnetic-pole end 20a of a yoke 20 which is an upper core layer formed on top of the insulating layer 19 is brought out to the surface 6, and, this portion is made to face the lower core layer 16 (which is also the upper shield layer) so as to be separated by a very small distance therefrom. A base end 20b of the yoke 20 is provided so as to be magnetically connected to the upper shield layer 16 (which is also the lower core layer). The magnetic-pole end 20a of the yoke 20 is positioned on the surface 6 side in order to form a write magnetic gap between the magnetic-pole end 20a and the end of the upper shield layer 16 at the surface 6 side. A protective layer 8 formed of, for example, alumina is provided on top of the upper core layer 20, and the core base 3 is connected through the protective layer 8.

Figure 5:
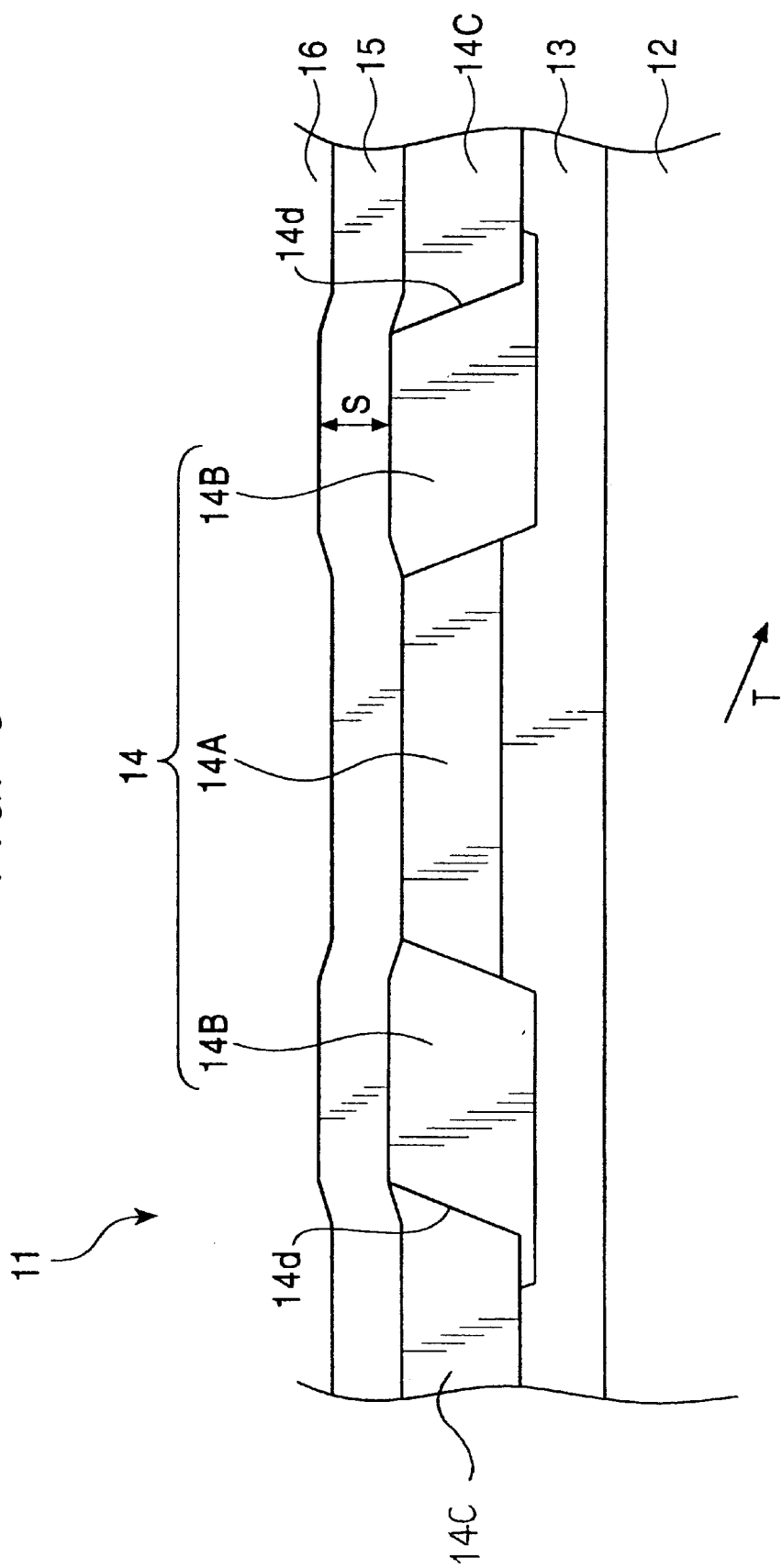
FIG. 5 is a front view of a magnetoresistive element shown in FIG. 3 and the vicinity thereof.
Figure 6:
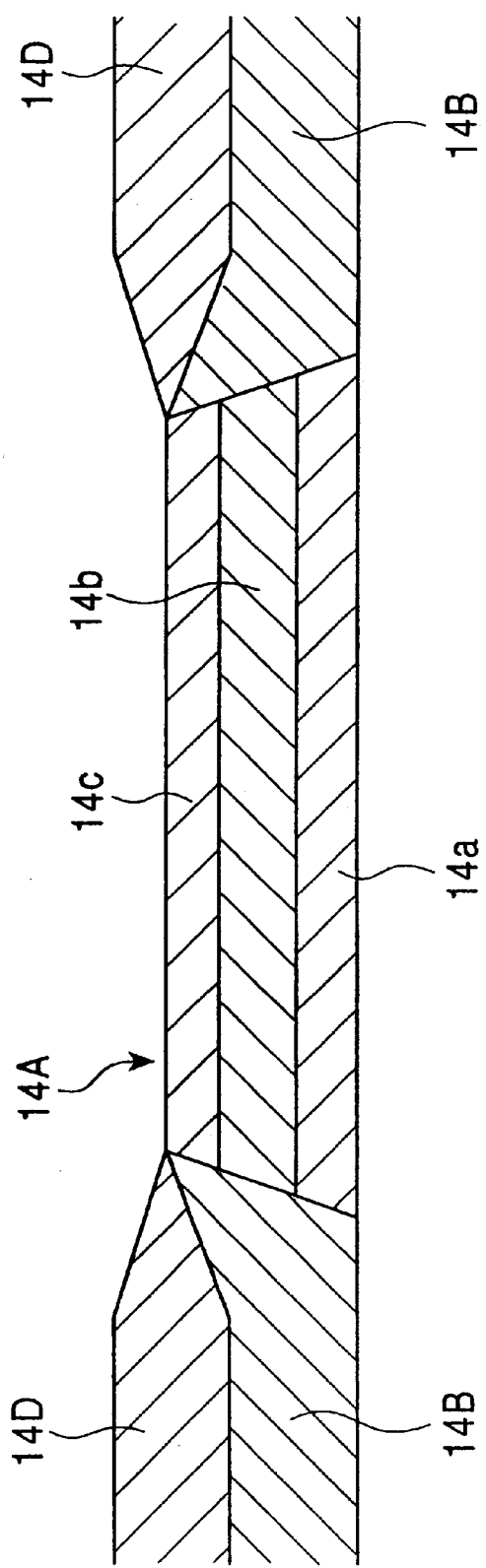
FIG. 6 is a cross-sectional view of a first embodiment of a layered structure of the magnetoresistive element shown in FIG. 5.
Figure 7:
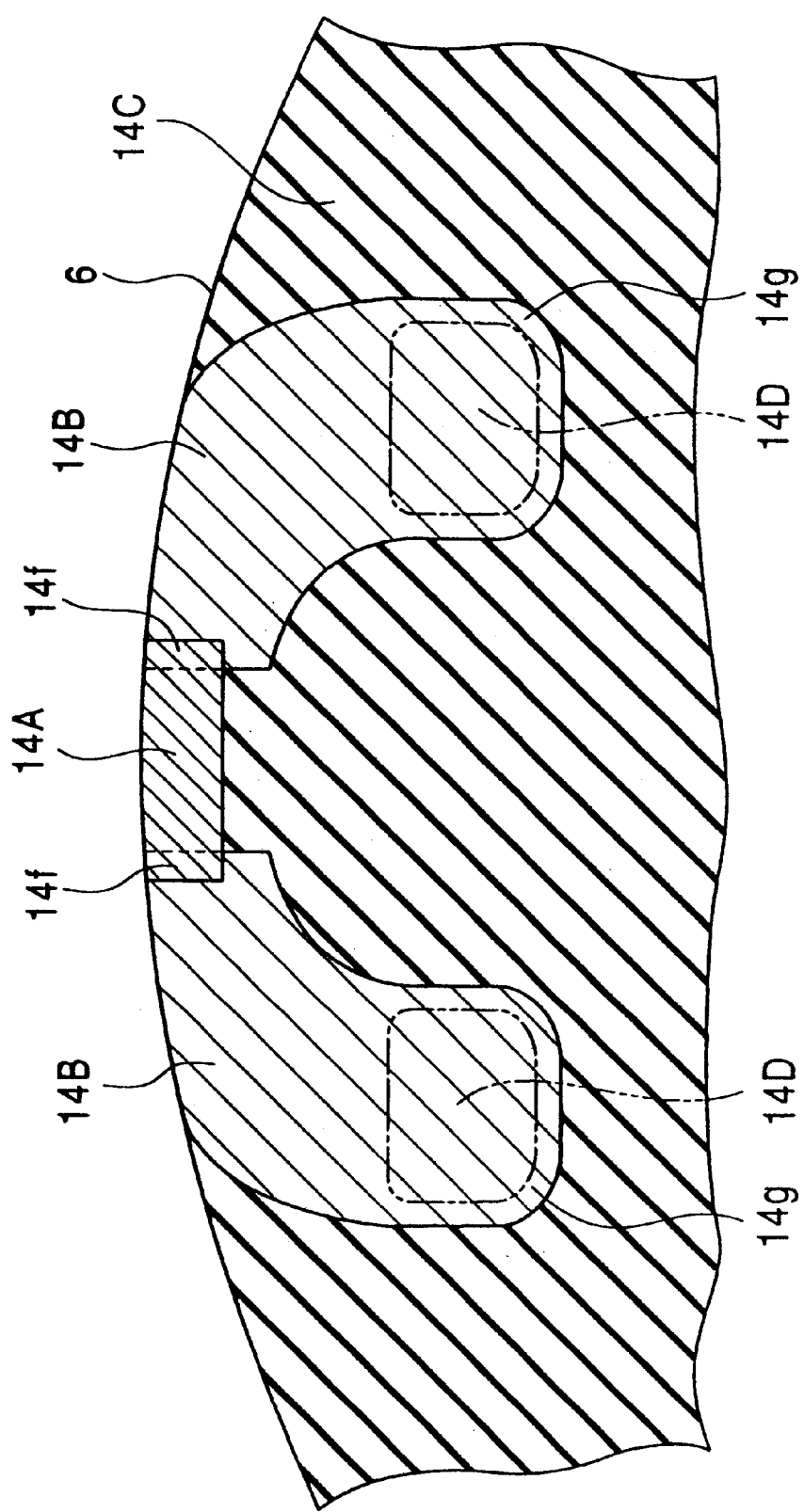
FIG. 7 is a sectional plan view showing the positional relationship between bias layers and a magnetoresistive film of the magnetoresistive element shown in FIG. 5.

FIG. 5 is a front view of a magnetoresistive element 14. FIG. 6 is a front sectional view showing a first example of a layered structure of the magnetoresistive element shown in FIG. 5. FIG. 7 is a sectional plan view of the positional relationship between the bias layers and a magnetoresistive film of the magnetoresistive element shown in FIG. 5.

Magnetoresistive element 14 is an MR element constructed so that a nonmagnetic film is sandwiched between a ferromagnetic film and a magnetoresistive film or is a giant, spin-valve-type magnetoresistive multilayered element. In the magnetoresistive element 14, electrode layers 14D and bias layers 14B are connected together as described later. Therefore, when, from a magnetic recording medium such as a magnetic tape, a leakage magnetic field acts on the magnetoresistive element 14 while a detection electrical current is supplied from the electrode layers 14D, the resistance of the magnetoresistive element 14 changes.

In the read head 11, the electrical resistance of the magnetoresistive film changes depending on whether or not there is leakage magnetic field from the magnetic tape, so that, by detecting this change in resistance, what is magnetically recorded on the magnetic tape can be read.

As shown in FIG. 5, the magnetoresistive element 14 comprises a magnetoresistive film 14A, the bias layers 14B and 14B, and the electrode layers 14D. The magnetoresistive film 14A exhibits magnetoresistive effects and has a substantially trapezoidal shape in cross section. The bias layers 14B and 14B are formed of hard magnetic material and are disposed on both the left and right sides of the magnetoresistive film 14A (that is, at both outer sides which extend inwards towards a film surface) so as to cover the ends of the magnetoresistive film 14A. The electrode layers 14D are formed in the vicinity of the magnetoresistive film 14A so as to cover the bias layers 14B.

As shown in FIG. 6, the magnetoresistive film 14A may have an MR element structure which is trapezoidal in cross section formed by placing a soft magnetic film 14a, a nonmagnetic film 14b, and a soft magnetic film 14c upon each other.

Here, the bias layers 14B are provided in order to reduce Barkhausen noise by forming the soft magnetic film 14a into a single magnetic domain film as a result of applying bias magnetic field to the soft magnetic film 14a. The bias layers 14B have the important role of causing the magnetoresistive element 14A to exhibit magnetoresistive effects. In order for bias magnetic fields to be efficiently and reliably applied, the bias layers 14B need to be formed with a certain large volume.

Therefore, as shown in FIG. 7, the bias layers 14B are covered with the magnetoresistive film 14A at one end portions 14f. Other than at the one end portions 14f, the bias layers 14B extend outwardly from the magnetoresistive film 14A. The electrode layers 14D and 14D are connected to other end portions 14g.

As shown in FIG. 7, a middle insulating layer 14C is disposed at the outer sides of the magnetoresistive film 14A and the bias layers 14B substantially in the same plane as the magnetoresistive film 14A and the bias layers 14B (that is, in the same level as viewed from the film thickness S direction of the upper gap layer 15 shown in FIG. 5).

The bias layer 14B has edge 14d (having corresponding surfaces in the film thickness direction thereof) formed at the outer sides thereof. The edges 14d are connected while almost the whole surfaces thereof are covered by the magnetic middle insulating layer 14C. Therefore, the bias layer 14B, the magnetoresistive film 14A, and the middle insulating layer 14C are formed with substantially the same film thicknesses, so that the bottom surface of the upper insulating layer 15, that is, the surface of the upper insulating layer 15 at the side of the lower insulating layer 13 is formed in a smooth state.

Figure 8:
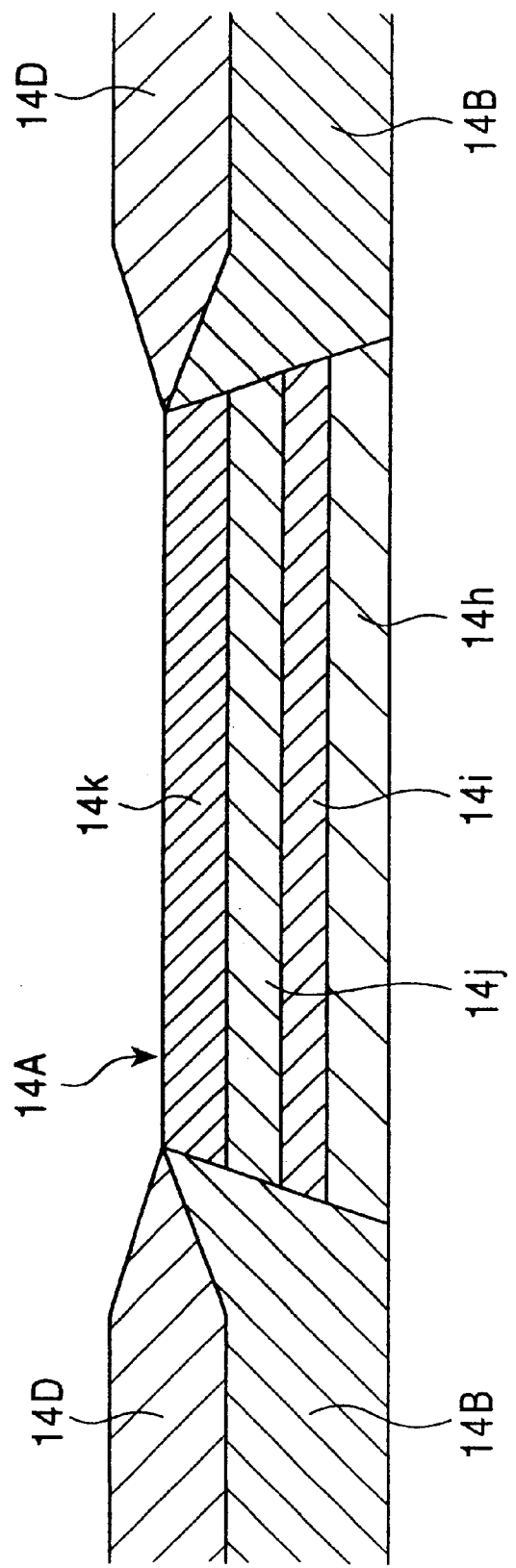
FIG. 8 is a front sectional view of another embodiment of a layered structure of the magnetoresistive element shown in FIG. 5.

FIG. 8 is a front sectional view of another embodiment of a layered structure of the magnetoresistive element shown in FIG. 5. As shown in FIG. 8, the magnetoresistive film 14A may be formed as a giant magnetoresistive film of the spin-valve type comprising a free magnetic film 14h, a nonmagnetic intermediate film 14i, a fixed magnetic film 14j, and an antiferromagnetic film 14k. In this structure, when the application of an external field causes the direction of magnetization of the free magnetic film 14h to change with respect to the direction of magnetization of the fixed magnetic film 14j, which has been fixed as a result of switched coupling with the antiferromagnetic film 14k, the resistance of the magnetoresistive film 14A changes. This change in resistance can be detected by a change in the applied detection current.

Here, the bias layers 14B are provided in order to reduce Barkhausen noise by forming the free magnetic film 14h into a single magnetic domain film as a result of applying a bias magnetic field to the free magnetic film 14h. The bias layers 14B play an important role in the magnetoresistive element, and are preferably formed with a certain large volume for efficiently and reliably applying bias magnetic fields.

Accordingly, as in the first-example magnetoresistive element structure, as shown in FIG. 8, at one end portions 14f, the bias layers 14B are covered by the magnetoresistive film 14A, whereas, other than at the one end portions 14f, they extend outwardly from the magnetoresistive film 14A.

Unlike what is called a top-type structure shown in FIG. 8, a giant spin-valve-type magnetoresistive film can also be formed as a bottom-type structure in which the antiferromagnetic film 14k, the fixed magnetic film 14j, the nonmagnetic intermediate film 14i, and the free magnetic film 14h are successively placed in that order from the base, that is, in an order opposite to the order in which these films 14k, 14j, 14i, and 14h are placed upon each other in the top-type structure.

Referring back to FIG. 4, in write head 10, a record electrical current is supplied to a thin-film coil section 18 in order to apply a magnetomotive force from the thin-film coil section 18 to a yoke 20. Leakage magnetic field from a magnetic end 20a of the yoke 20 and an upper shield layer 16 serving as the lower core layer at a magnetic gap allows a magnetic signal to be recorded onto a magnetic recording medium such as a magnetic tape.

Figure 9:
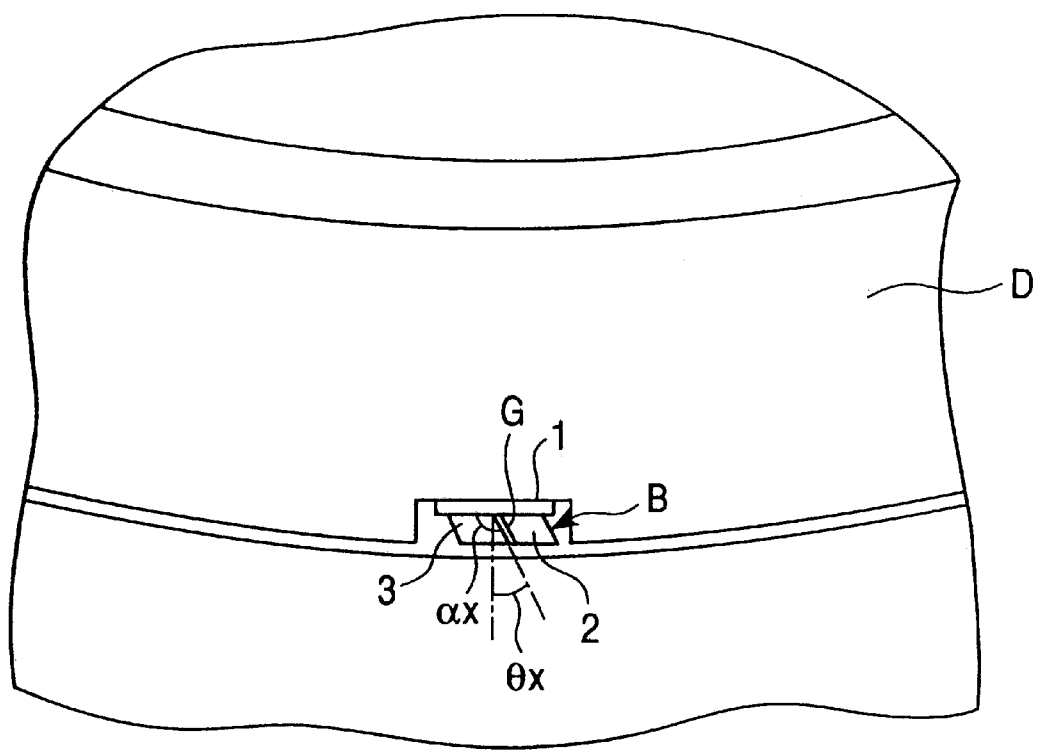
FIG. 9 is a side view showing a state in which a rotary head assembly comprising the thin-film magnetic head shown in FIG. 1 is mounted to a rotary drum.
Figure 10:
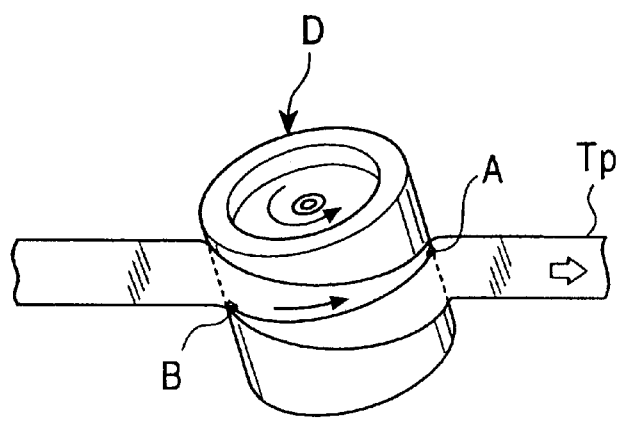
FIG. 10 is a perspective view used to illustrate a recording/reproducing operation by helical scanning using the rotary head shown in FIG. 9.

FIG. 9 is a side view showing a state in which a rotary head assembly using the thin-film magnetic head shown in FIG. 1 is mounted to a rotary drum. FIG. 10 is a perspective view used to illustrate a recording/reproducing operation by helical scanning using the rotary head shown in FIG. 9. FIG. 11 is a schematic view used to illustrate the recording operation to a magnetic tape using the rotary head shown in FIG. 9.

As shown in FIG. 1, the rotary head assembly is constructed by mounting the thin-film magnetic head B to the base plate 1. As shown in FIGS. 9 and 10, the rotary head assembly is mounted on a rotary drum D in order to form a video head. While the thin-film magnetic head B mounted to the base plate 1 is mounted on the rotary drum D, the azimuthal angle θx of the magnetic gap G of the MR head 11 and that of the magnetic gap of the write head 10 are determined. As shown in FIG. 10, a thin-film magnetic head A having different azimuthal angles from those in the thin-film magnetic head B is provided on the rotary drum D in order to form a combination head. Here, other than having different azimuthal angles, the thin-film magnetic head A has substantially the same structure as the thin-film magnetic head B.

Accordingly, as shown in FIG. 11, a track T1 which is to be subjected to a reproducing operation by the thin-film magnetic head A has an area which is overlapped by a different track T2 which is adjacent thereto and which has been subjected to a recording operation by the thin-film magnetic head B. However, by making use of azimuthal loss based on an azimuthal angle θ1 of the track T1 being different from an azimuthal angle θx of the track T2, it is possible to carry out an azimuthal recording/reproducing operation by a helical-scanning-type magnetic recording/reproducing device which eliminates crosstalk between adjacent tracks.

In the thin-film magnetic head B, when an azimuthal recording/reproducing operation has been carried out, a magnetic tape Tp is sliding in the direction of arrow T shown in FIG. 5. Here, at the magnetic gap G which is formed by the separation of the upper shield layer 16 and the lower shield layer 12 from each other, the middle insulating layer 14C is formed in substantially the same plane as the magnetoresistive element 14. Therefore, even in the vicinity of the magnetoresistive element 14, the thickness of the upper insulating layer 15 can be set to a substantially constant value such as S shown in FIG. 5, making it possible to make the separation between both shield layers 12 and 16 substantially constant.

Consequently, even when an azimuthal recording/reproducing operation has been carried out, regardless of the sliding direction T of the magnetic tape Tp, the separation between the upper shield 16 and the magnetoresistive element 14, and that between the lower shield layer 12 and the magnetoresistive element 14 with respect to the sliding direction T can be made constant. As a result, even when drooping portions are formed as a result of the upper shield layer 16, the magnetoresistive element 14, and the lower shield 12 being stretched like candy by the sliding of the magnetic tape Tp, it is possible to singularly reduce the tendency with which shorting occurs in the sliding direction T of the magnetic tape Tp due to the formation of such drooping portions. In other words, the inventive structure considerably reduces the frequency with which smearing occurs based on the existence of an azimuthal angle. In addition, even when high density recording is achieved as a result of making the magnetic gap G smaller, it is still possible to reduce smearing.

Hereunder, a description of a method of producing the first embodiment of the thin-film magnetic head will be given.

FIGS. 12 to 15 are cross-sectional views illustrating the method of producing the first embodiment of the thin-film magnetic head.

Figure 12:
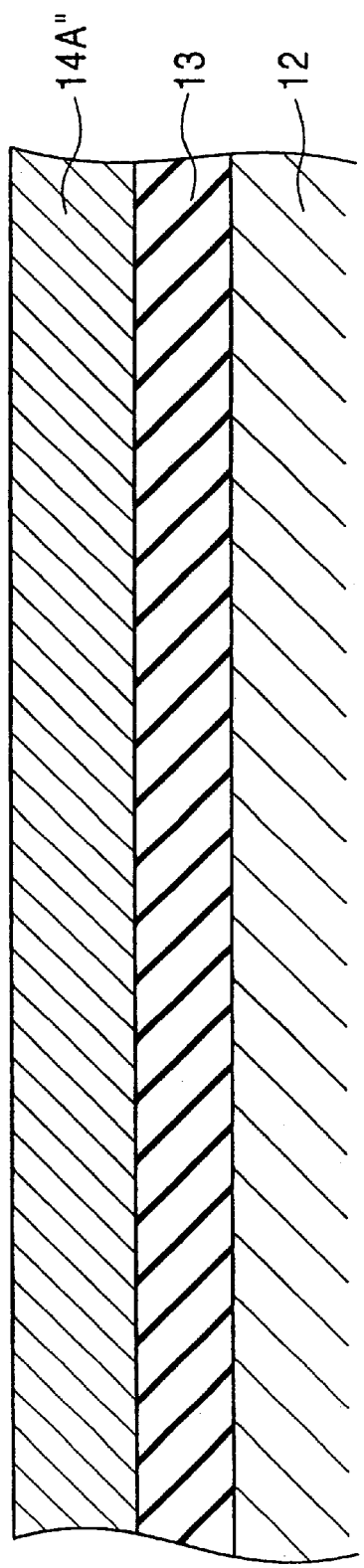
FIG. 12 is a sectional view used to illustrate a method of producing the first embodiment of the thin-film magnetic head in accordance with the present invention.

As shown in FIG. 12, from the core base 2 (formed of, for example, $CaTiO_3$ or $Al_2O_3$—TiC) upward, an underlying layer (not shown) formed of $Al_2O_3$, the lower shield layer 12, the lower insulating layer 13, and an MR film 14A" (which becomes the magnetoresistive film 14A) are placed upon each other to form a layered structure having a predetermined film thickness by, for example, plating or sputtering.

Figure 13:
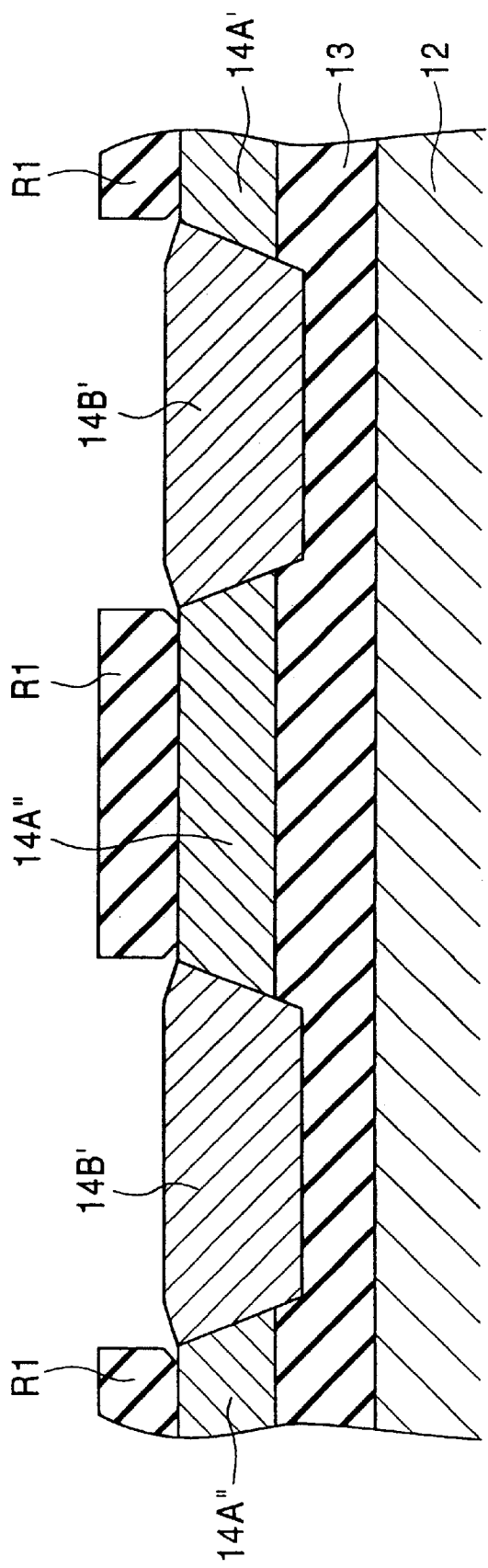
FIG. 13 is a sectional view used to illustrate the method of producing the first embodiment of the thin-film magnetic head in accordance with the present invention.

Then, a resist pattern R1 is formed to overlie MR film 14A". After forming the resist pattern R1, ion milling or etching is carried out to remove portions of the MR film 14A" and the lower insulating layer 13. Next, as shown in FIG. 13, a film deposition method, such as plating or sputtering is carried out to form bias layers 14B' (which will subsequently become bias layers 14B).

Figure 14:
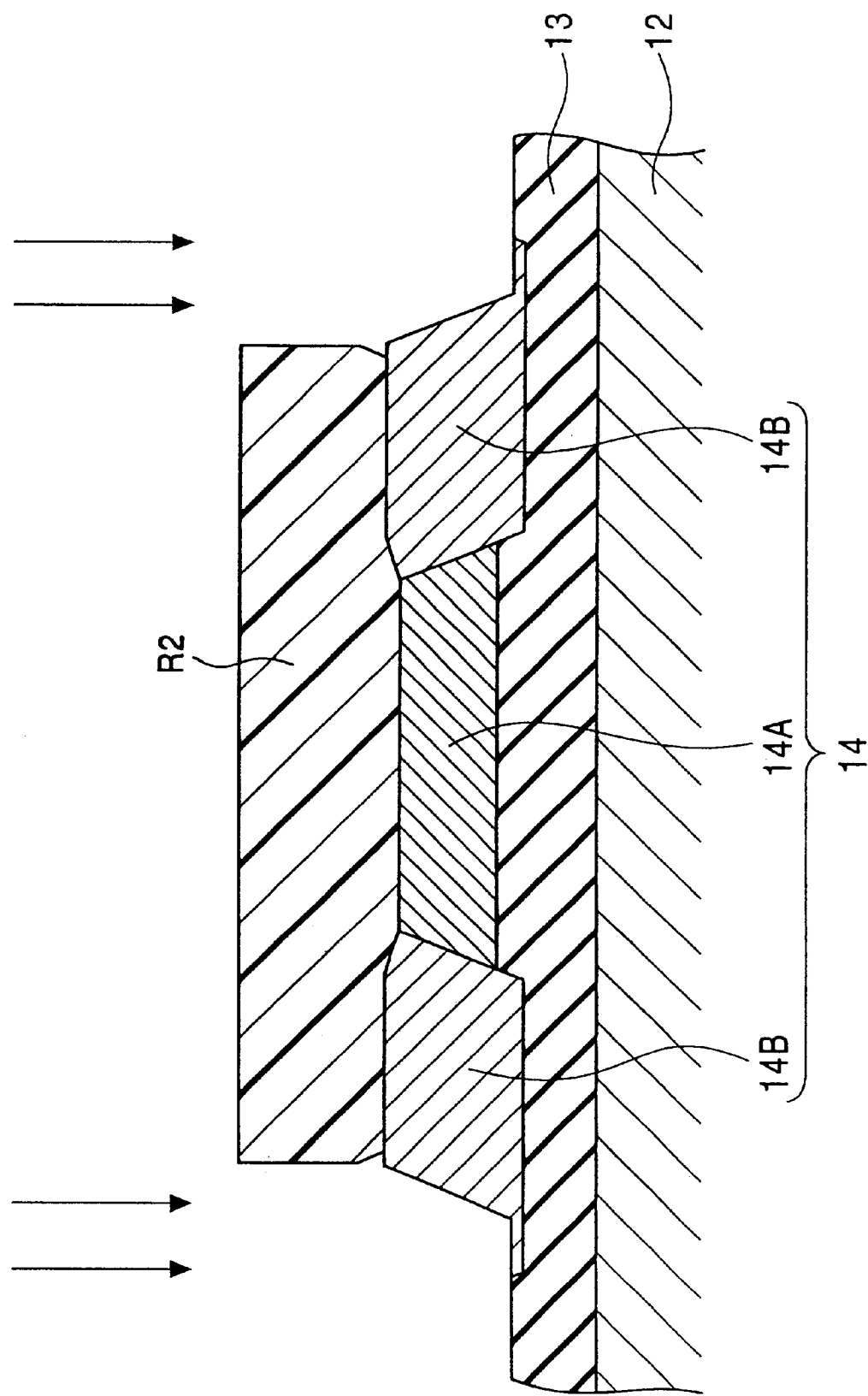
FIG. 14 is a sectional view used to illustrate the method of producing the first embodiment of the thin-film magnetic head in accordance with the present invention.

After performing the film deposition method resist pattern R1 is removed and, as shown in FIG. 14, a resist pattern R2 is formed on the magnetoresistive film 14A and the bias layers 14B (which make up the magnetoresistive element 14). After the patterning, ion milling or the like is carried out to remove portions of the lower insulating layer 13, the bias layers 14B', and the MR film 14A". Here, the resist R2 is what is called a lift-off resist having a cut formed in the lower surface thereof.

Figure 15:
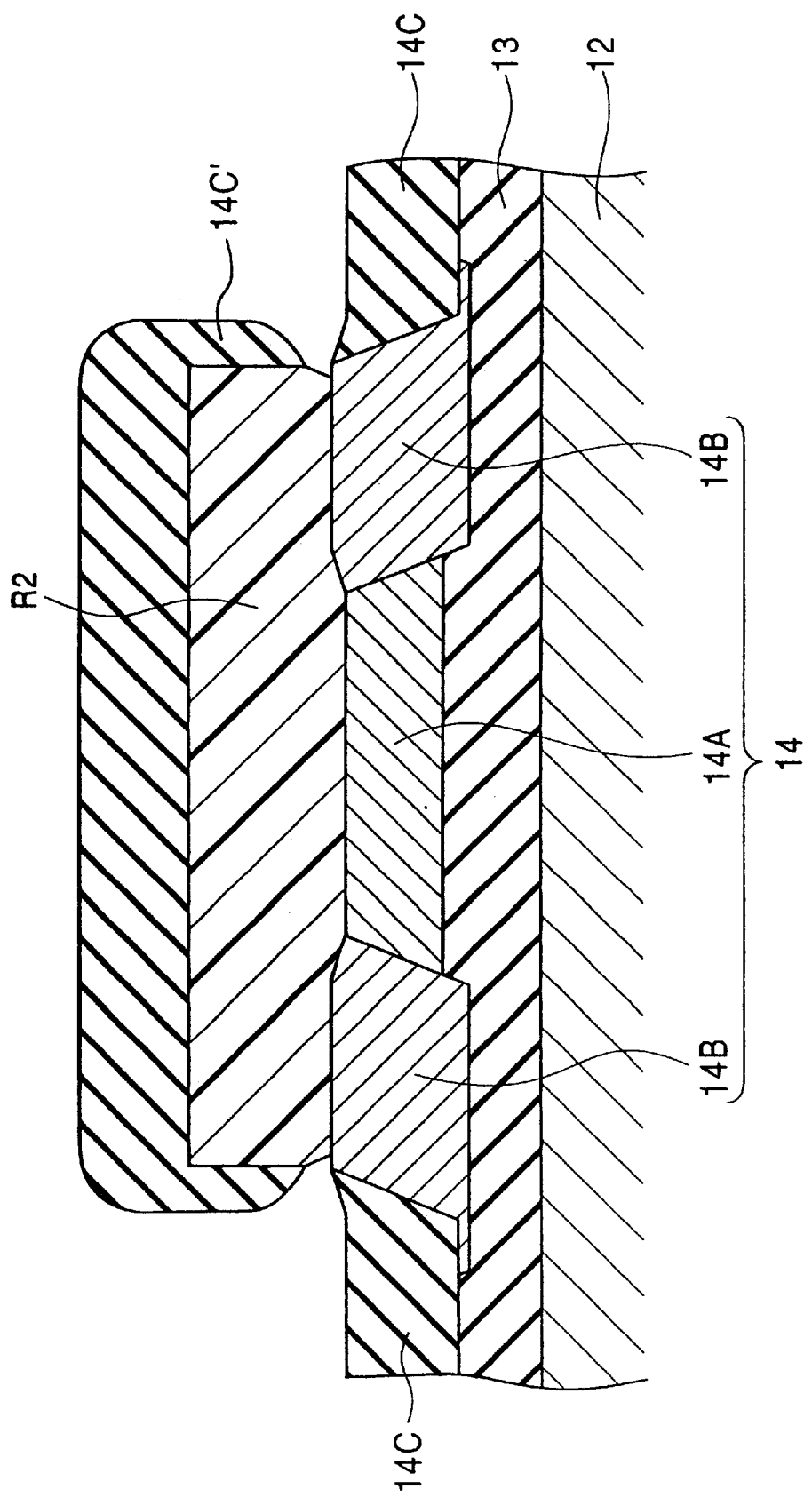
FIG. 15 is a sectional view used to illustrate the method of producing the first embodiment of the thin-film magnetic head in accordance with the present invention.

Thereafter, as shown in FIG. 15, with the resist R2 left on, the middle insulating layer 14C is deposited by a film deposition method such as sputtering. Here, by depositing the middle insulating layer 14C to a film thickness which is substantially the same as that of the magnetoresistive element 14, the top surfaces of the middle insulating layer 14C and the magnetoresistive element 14 can be formed into a smooth state.

It is preferable that the sputtering method used in depositing the middle insulating layer 14C be an ion beam sputtering method, a long-throw sputtering method, or a collimation sputtering method, or a combination of any of these sputtering methods. The base to which the magnetoresistive element 14 is formed is positioned substantially perpendicular to a beam which is emitted from a target having the same composition as the middle insulating layer 14C. Then, by using, for example, the ion beam sputtering method, the middle insulating layer 14C can be deposited onto the magnetoresistive element 14 from the substantially vertical direction, so that the middle insulating film 14C will not enter the cut in the resist R2. A layer 14C' which has the same composition as the middle insulating layer 14C is formed on the resist R2.

In the next step, the resist R2, which is shown in FIG. 15, is removed by a lift-off operation using a resist peeling liquid. After the removal of the resist R2, the upper insulating layer 15 and the upper shield layer 16 are successively placed onto the smooth top surfaces of the magnetoresistive element 14 and the intermediately adjacent insulating layer 14C so as to have a predetermined thickness. Thereafter, the electrode layers 14D are formed in order to form a structure which corresponds to that of the MR head 11 shown in FIGS. 5, 6 and 7.

Then, after forming the structure which corresponds to that of the write head 10, with the azimuthal angle set at θx, the base is cut and lapped in order to form the core base 2 (shown in FIGS. 3 and 4). The core base 2 is joined to the core base 3 in order to form an assembled structure (shown in FIG. 1). After the lapping step which is carried out to form the surface 6 by lapping using a lapping tape or the like, the thin-film magnetic head B is completed. Here, in the lapping step which is carried out in forming the surface 6, the lapping tape is slid in a direction which is substantially the same as the sliding direction of the magnetic tape Tp shown in FIG. 10 (also shown as the direction of arrow T in FIG. 5) to perform the lapping operation.

At the final stage, the thin-film magnetic head B is mounted on the base plate 1 in order to form a rotary head assembly, and, as shown in FIGS. 9 and 10, the rotary head assembly is mounted on the rotary drum D, whereby a video head is formed.

In the first embodiment, as described above, the magnetoresistive element 14, which has been subjected to a pattering operation using the resist R2, is deposited. With the resist R2 left on, the middle insulating layer 14C is deposited. By peeling off the resist R2 by a lift-off operation after the film deposition, the top surfaces of the middle insulating layer 14C and the magnetoresistive element 14 can be formed into a smooth state, so that the thickness of the upper insulating layer 15 can be made substantially constant.

As a result, the lapping step using, for example, a lapping tape is carried out while the separation between the upper shield layer 16 and the magnetoresistive element 14, the separation between the lower shield layer 12 and the magnetoresistive element 14, and the separation distance between the upper shield layer 16 and the lower shield layer 12 are made constant. In the lapping step, regardless of the sliding direction of the lapping tape, which is substantially the same as the sliding direction T of the magnetic tape Tp, it is possible to prevent shorts across the gap caused by drooping portions that are formed when the upper shield layer 16, the magnetoresistive element 14, and the lower shield layer 12 are stretched like candy by the sliding of the lapping tape. In other words, it is possible to reduce the occurrence of smearing. Even when higher density recording is achieved by making the size of the magnetic gap G smaller, it is still possible to reduce the occurrence of smearing.

In the first embodiment, although a structure having a rotary drum, such as the structure of a VTR head, is used, any other structure may be used as long as the magnetic head is of a type which slides with respect to a magnetic recording medium, such as a magnetic tape.

Figure 18:
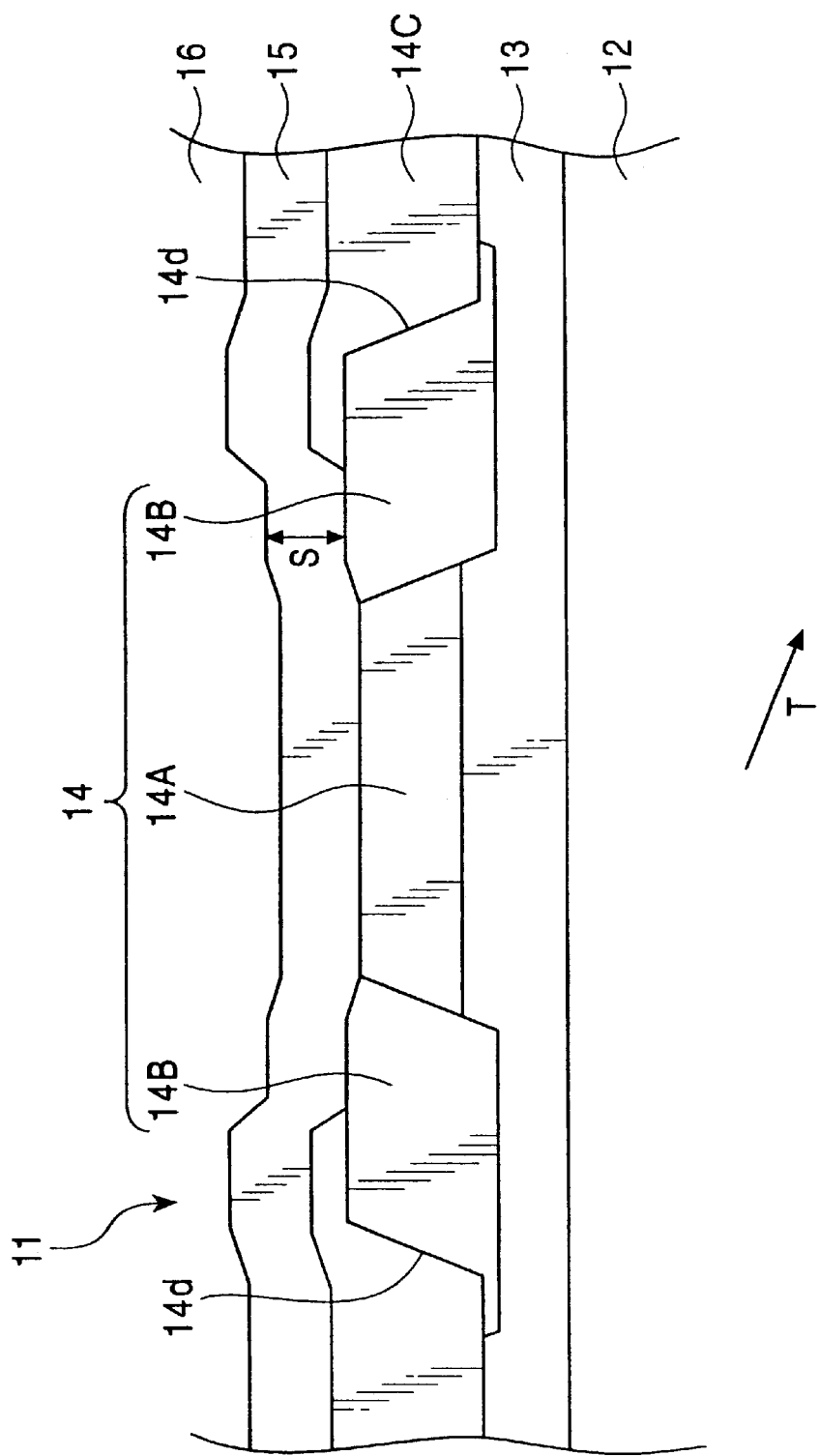
FIG. 18 is a front view of another example of the vicinity of the magnetoresistive element shown in FIG. 3.
Figure 19:
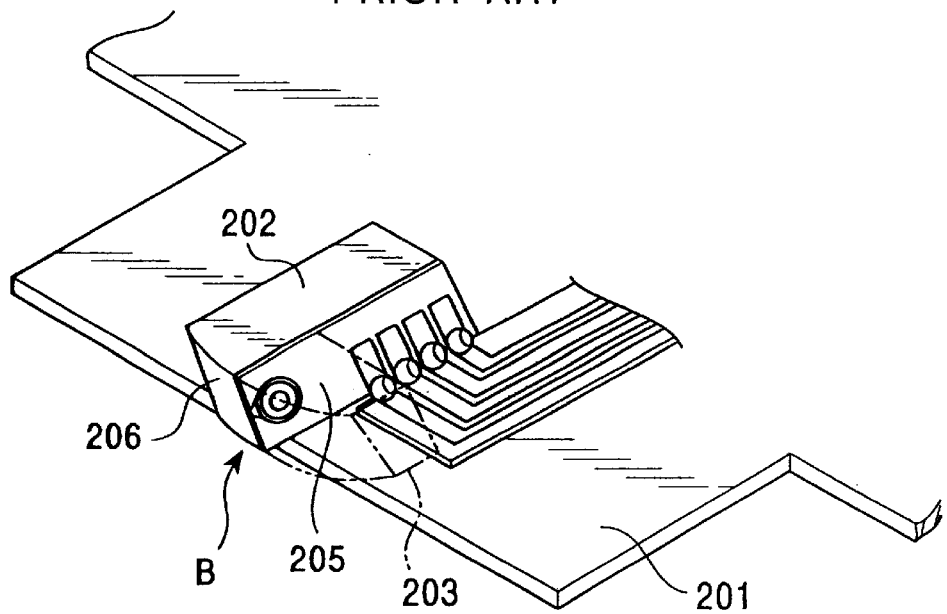
FIG. 19 is a perspective view of a conventional sliding magnetic head.
Figure 20:
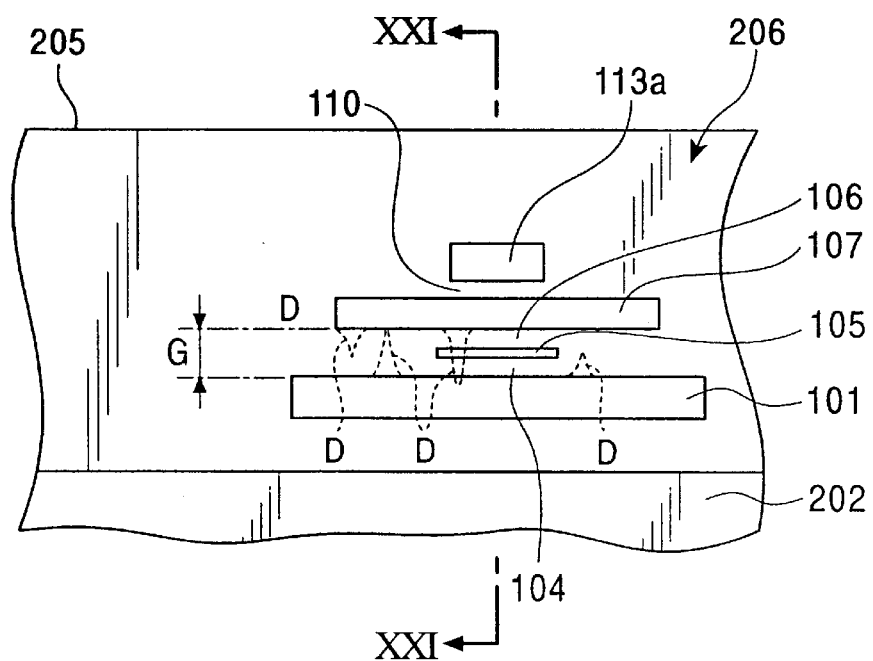
FIG. 20 is a schematic plan view of the main portion of the sliding magnetic head shown in FIG. 19, as viewed from a side of the magnetic head opposing a medium.
Figure 21:
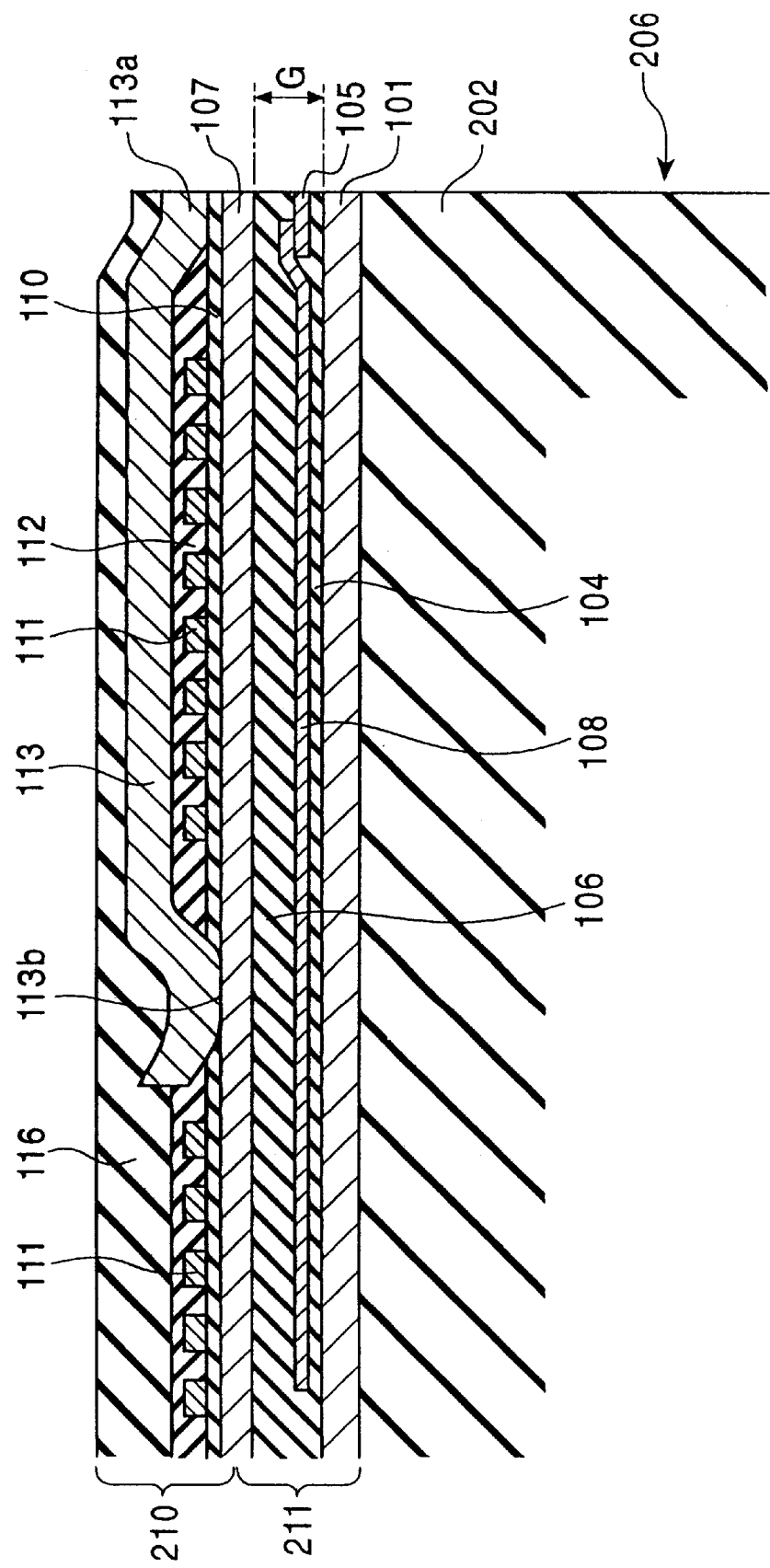
FIG. 21 is a sectional view taken along line XXI—XXI of FIG. 20.

In the first embodiment, a structure (shown in FIG. 18) that is different from that shown in FIG. 5 may also be used. In this structure, the middle insulating layer 14C protrudes from the bias layers 14B. Without changing the size of the magnetic gap G at the magnetoresistive film 14A (that is, the thickness of the magnetoresistive film 14A), at portions other than the magnetoresistive film 14A (that is, the bias layers 14B and the portions at the outer sides thereof), a gap layer can be made thick, making it possible to further reduce the occurrence of smearing.

Hereunder, a description of a second embodiment of a thin-film magnetic head in accordance with the present invention will be described with reference to the relevant drawings.

[Second Embodiment]

Figure 16:
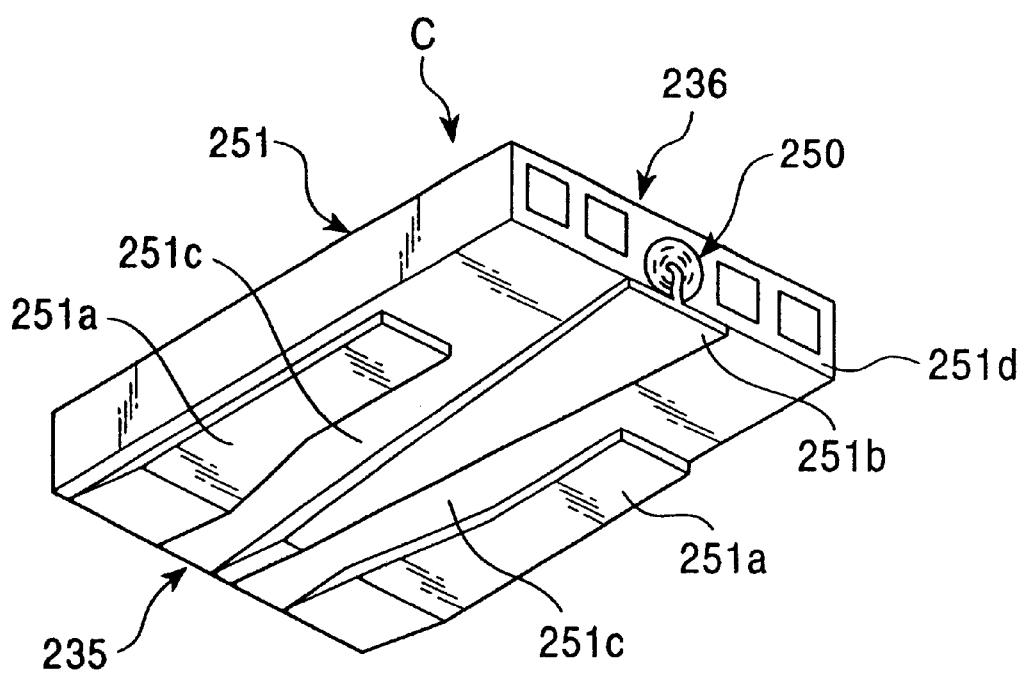
FIG. 16 is a perspective view of a second embodiment of a thin-film magnetic head in accordance with the present invention.
Figure 17:
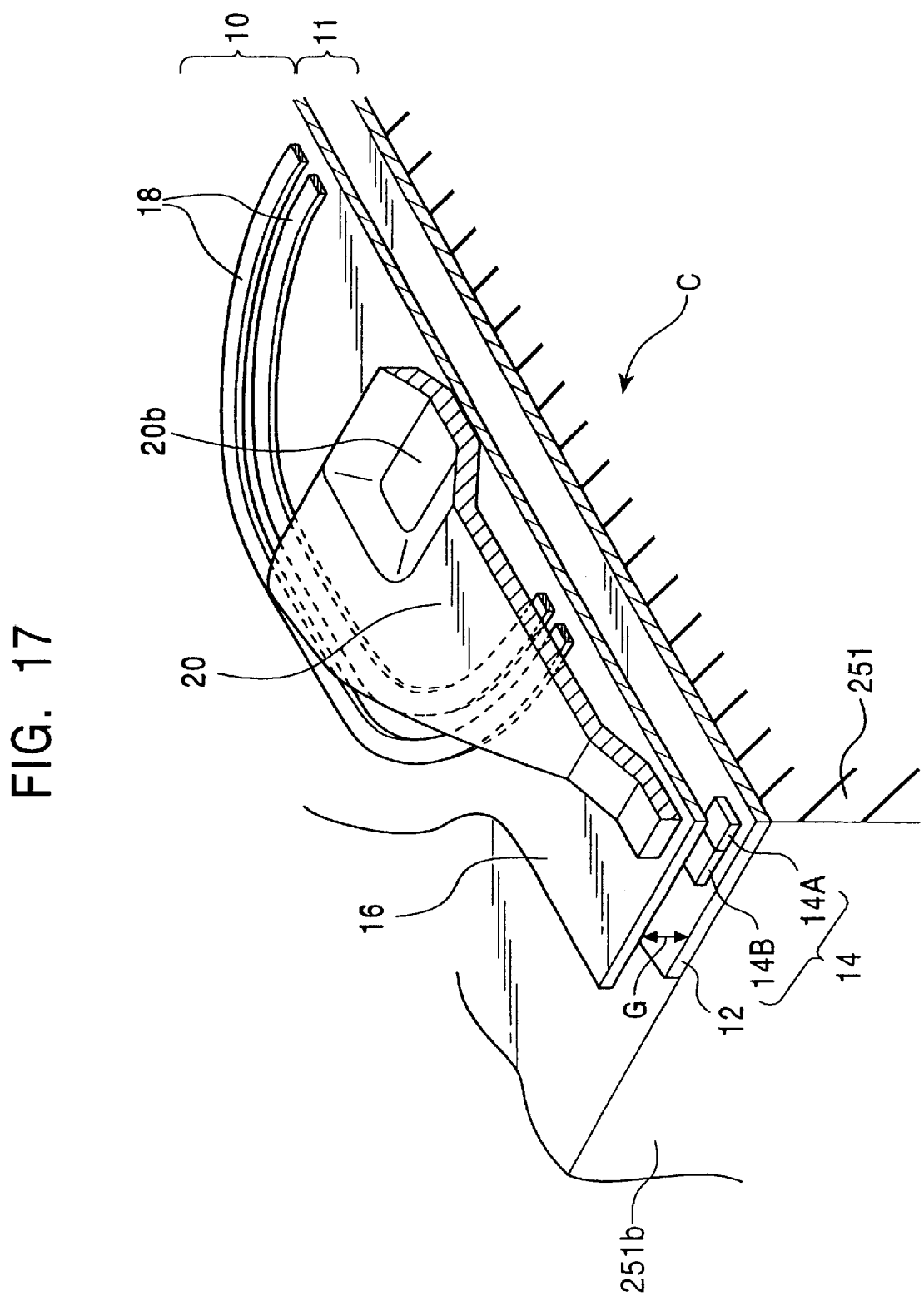
FIG. 17 is an enlarged schematic perspective view of the main portion of the thin-film magnetic head shown in FIG. 16.

FIG. 16 is a perspective view of a second embodiment of a thin-film magnetic head in accordance with the present invention and FIG. 17 is an enlarged schematic perspective of the main portion thereof.

A thin-film magnetic head C of the second embodiment differs from the magnetic head B of the first embodiment shown in FIGS. 1 to 15 in that it is a flying head having a magnetic recording medium, such as a hard disk device, installed therein. Other structural features are the same. The corresponding structural elements are given the same reference numerals.

Figure 22:
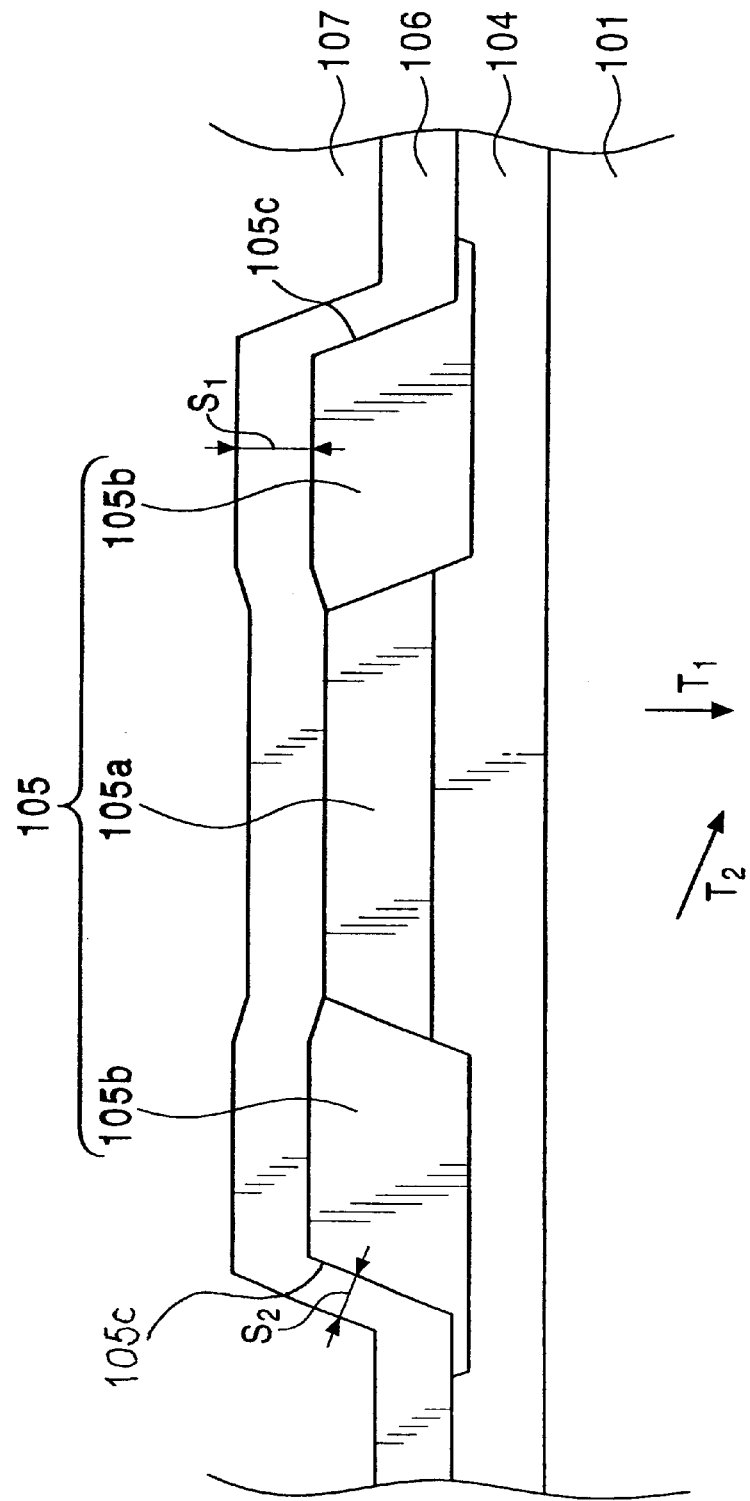
FIG. 22 is an enlarged plan view of an MR element 105 shown in FIG. 20 and the vicinity thereof.
Figure 23:
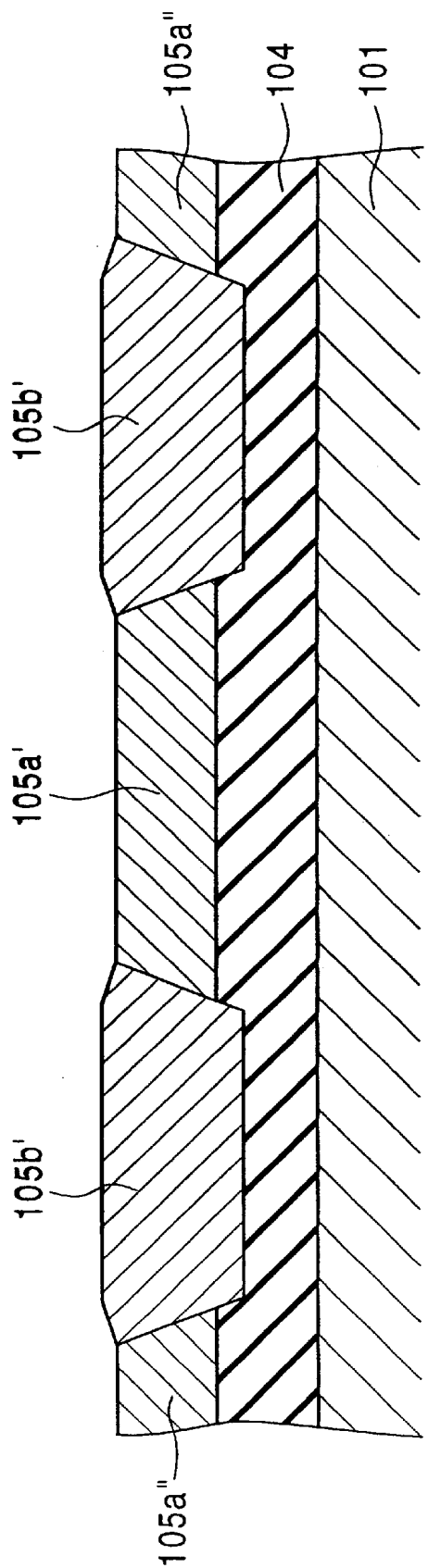
FIG. 23 is an enlarged sectional view showing the MR element 105 and the vicinity of the MR element 105 in a method of producing the sliding magnetic head shown in FIG. 19.

In the thin-film magnetic head C of the second embodiment, a side 235 (shown in FIG. 22) of a slider 251 is a reading side corresponding to the upstream side of the direction of movement of the surface of a disk, and a side 236 (also shown in FIG. 22) of the slider 251 is a trailing side. Rail-shaped air bearing surfaces (ABS) or rail flying surfaces 251a, 251a, and 251b are formed on the surface of the slider 251, and air grooves 251c and 251c are formed in the surface of the slider 251.

A magnetic core 250 is formed on an end surface 251d disposed at the trailing side of the slider 251.

In the magnetic core 250 of the thin-film magnetic head, a combination-type magnetic head structure shown in FIG. 17 is used. The structure is formed by successively placing an MR head (that is, a read head) 11 and an inductive head (that is, a write head) 10 upon each other on the trailing side end surface 251d of the slider 251.

As in the MR head 11 in the first embodiment shown in FIG. 4, in the MR head 11 in the second embodiment, a lower gap layer (that is, a lower insulating layer) 13 is formed on a lower shield layer 12, and a magnetoresistive element 14 and a middle insulating layer 14C are placed on the lower gap layer 13. The lower shield layer 12 is formed of a magnetic alloy and is disposed at the trailing side end of the slider 251 which is also a base. An upper shield layer 16 is formed on top of the magnetoresistive element 14 through an upper gap layer (that is, an upper insulating layer) 15. The upper shield layer 16 is also a lower core layer of the inductive head 10 which is formed thereabove.

Based on whether or not there is a very small amount of leakage magnetic field from a magnetic recording medium such as a hard disk, the resistance of the magnetoresistive element 14 of the MR head 11 is changed. By reading this change in resistance, the recording medium can be read.

The magnetoresistive element 14 of the MR head 11 is a spin-valve-type thin-film magnetic element (mentioned above), that is, a giant magnetoresistive element such as that shown in FIG. 8. The spin-valve-type thin-film element is the most important structural part of the thin-film magnetic head (that is, the reproducing head).

Referring back to FIG. 4, in the inductive head 10, a gap layer 17 is formed, on top of the lower core layer 16, and a coil layer 18 which has been patterned so as to be spiral in a plane is formed on top of the gap layer 17. The coil layer 18 is surrounded by an insulating layer 19. At the ABS 251b (that is, the surface opposing the recording medium shown in FIG. 16), a magnetic-pole end 20a of an upper core layer 20 which is formed on top of the insulating layer 19 is made to oppose the lower core layer 16 so as separated from each other by a distance equal to the thickness of a write magnetic gap. A protective layer 8 formed of, for example, alumina is provided on top of the upper core layer 20. As shown in FIG. 17, a base end 20b is provided so as to be magnetically connected to the lower core layer 16.

In the inductive head 10, a recording electrical current is supplied to the coil layer 18, and a recording magnetic flux is supplied to the core layer 20 from the coil layer 18. By a leakage magnetic field from the end 20a of the upper core layer 20 and the lower core layer 16 at the magnetic gap, the inductive head 10 records magnetic signals onto a magnetic recording medium such as a hard disk.

The method used to produce the magnetoresistive element 14 and the portions in the vicinity of the thin-film magnetic head B is also performed in producing the thin-film magnetic head C.

In a molding step, the surface 251b of the thin-film magnetic head C which corresponds to the surface 6 in the first embodiment is molded by a lapping step. The lapping is carried out using, for example, a lapping table formed of a tin (Sn) alloy.

As in the first embodiment, in the second embodiment, the top surfaces of the middle insulating layer 14C and the magnetoresistive element 14 can be formed into a smooth state, making it possible to make the thickness of the upper insulating layer 15 substantially constant.

As a result, the lapping step which is carried out using, for example, a lapping table during the producing process is performed while the separation between the upper shield layer 16 and the magnetoresistive element 14, and the separation distance between the lower shield layer 12 and the magnetoresistive element 14 are constant. In the lapping step, regardless of the sliding direction of the lapping table, it is possible to prevent the gap from the occurrence of shorts caused by drooping portions that are formed when the upper shield layer 16, the magnetoresistive element 14, and the lower shield layer 12 are stretched like candy by the sliding of the lapping table. In other words, it is possible to reduce the occurrence of smearing. Even when higher density recording is achieved by making the size of the magnetic gap G smaller, it is possible to reduce the occurrence of smearing.

The structure of the slider of the thin-film magnetic head and the structure of the inductive head are not limited to those shown in FIGS. 16 and 17. It is contemplated that various other structures may be used for the slider and the inductive head as long as they have flying structures.

The thin-film magnetic heads of the first and second embodiments provide the following advantages.

(1) In each of the first and second embodiments, by forming a middle insulating layer, the upper insulating layer can be substantially uniformly placed upon the portion of the MR head from the vicinity of the middle insulating layer to the magnetoresistive element. Therefore, it is possible to make the separation distance between the upper shield layer and the lower shield layer uniform in the vicinity of the magnetoresistive element. Therefore, even when a magnetic head that performs an azimuthal recording/reproducing operation by the helical scanning method is used in which the aforementioned azimuthal angle is provided, it is possible to separate the upper shield layer and the magnetoresistive element and the lower shield layer and the magnetoresistive element by suitable distances. Accordingly, it is possible to reduce the tendency with which smearing occurs due to the azimuthal angle when the shield layers are stretched with respect to each other due to the sliding of the head and the magnetic recording medium, such as a tape.

Therefore, in each of the first and second embodiments, even when the separation between the upper and lower shield layers, that is, the size of the magnetic gap is made small, it is possible to reduce the occurrence of smearing in the sliding thin-film magnetic head, and, in particular, to reduce the occurrence of smearing when performing an azimuthal recording/reproducing operation by helical scanning.

(2) In each of the first and second embodiments of the present invention, by joining the middle insulating layer to the edges of the bias layers, the boundaries between the magnetoresistive film, the bias layers, the middle insulating layer, and the upper insulating layer can be made smooth, so that the thickness of the upper insulating layer can be set substantially constant. This makes it possible to smoothly form the upper insulating layer and the upper shield layer in the vicinity of the portion where the magnetoresistive film, the bias layers, and the middle insulating layer are joined together. Therefore, even when a magnetic head is provided that performs an azimuthal recording/reproducing operation by helical scanning where the aforementioned azimuthal angle is used, the separation between the upper shield layer and the magnetoresistive element and that between the lower shield layer and the magnetoresistive element can be separated by proper distances. This makes it possible to reduce the tendency with which smearing occurs when the shield layers are stretched by the sliding of the head and, for example, a lapping tape with respect to each other. Consequently, it is also possible to reduce the occurrence of smearing in the lapping step that is carried out to produce a sliding thin-film magnetic head or a flying thin-film magnetic head.

What is claimed is:

1. A thin-film magnetic head including a magnetoresistive element for reading out information as a result of sliding relative to a magnetic recording medium, the thin-film magnetic head comprising:
    a base;
    a lower shield layer which is formed on the base;
    a lower insulating layer which is formed on the lower shield layer;
    the magnetoresistive element which is formed on the lower insulating layer;
    an upper insulating layer which is formed on the magnetoresistive element; and
    an upper shield layer;
    wherein, on a surface which slides with respect to the medium, the magnetoresistive element is disposed in a sandwiched state between the upper insulating layer and the lower insulating layer; and
    wherein a middle insulating layer is formed on both sides of the magnetoresistive element in a widthwise direction thereof so as to be positioned in a same film plane as the magnetoresistive element,
    wherein the magnetoresistive element comprises a magnetoresistive film and a bias layer, the bias layer being positioned on both sides of the magnetoresistive film on the surface which slides with respect to the medium and being directly connected to the magnetoresistive film, and
    wherein the bias layer and the middle insulating layer are connected together on the surface which slides with respect to the medium.

2. A thin-film magnetic head including a magnetoresistive element for reading out information as a result of moving relative to a magnetic recording medium, the thin-film magnetic head comprising:
    a base;
    a lower shield layer which is formed on the base;
    a lower insulating layer which is formed on the lower shield layer;
    the magnetoresistive element which is formed on the lower insulating layer;
    an upper insulating layer which is formed on the magnetoresistive element; and
    an upper shield layer;
    wherein, on a surface which opposes the medium, the magnetoresistive element is disposed in a sandwiched state between the upper insulating layer and the lower insulating layer; and
    wherein a middle insulating layer is formed on both sides of the magnetoresistive element in a widthwise direction thereof so as to be positioned in a same film plane as the magnetoresistive element and
    wherein the magnetoresistive element comprises a magnetoresistive film and a bias layer, the bias layer being positioned on both sides of the magnetoresistive film on the surface which opposes the medium and being directly connected to the magnetoresistive film, and
    wherein the bias layer and the middle insulating layer are connected together on the surface which opposes the medium.

3. A thin-film magnetic head comprising:
    a base;
    a lower shield layer overlying the base;
    a lower insulating layer overlying the lower shield layer;
    a magnetoresistive element and a middle insulating layer overlying the lower insulating layer;
    bias layers adjacent to side surfaces of the magnetoresistive element and connected thereto,
    wherein the middle insulating layer is spaced apart from the magnetoresistive element by the bias layers, and
    wherein portions of the middle insulating layer reside on either side of the magnetoresistive element, such that the middle insulating layer and the magnetoresistive element form a continuous layer;
    an upper insulating layer overlying the middle insulating layer and the magnetoresistive element; and
    an upper shield layer overlying the upper insulating layer.

4. The thin-film magnetic head of claim 3 the further comprising electrodes in contact with the bias layers, wherein the bias layers each include a first end region in contact with the magnetoresistive element and a second end region spaced away from magnetoresistive element, and wherein the electrodes contact the bias layers at the second end regions.

5. The thin-film magnetic head of claim 3, wherein the upper insulating layer comprises a layer of insulating material having a substantially uniform thickness.

6. The thin-film magnetic head of claim 3, wherein the magnetoresistive element comprises:
    a first soft magnetic film;
    a second soft magnetic film; and
    a nonmagnetic film interposed between the first and second magnetic films.

7. The thin-film magnetic head of claim 3, wherein the magnetoresistive element comprises:
    a free magnetic film;
    a nonmagnetic film overlying the free magnetic film;
    a fixed magnetic film overlying the nonmagnetic film; and
    an antiferromagnetic film overlying the fixed magnetic film.

8. A thin-film magnetic head comprising:
    an upper shield layer and a lower shield layer;
    a lower insulating layer;
    an upper insulating layer;

a magnetoresistive element interposed between the a lower insulating layer and the upper insulating layer;

a middle insulating layer overlying the lower insulating layer;

bias layers adjacent to side surfaces of the magnetoresistive element and connected thereto, and wherein the middle insulating layer is spaced apart from the magnetoresistive element by the bias layers, wherein portions of the middle insulating layer reside on either side of the magnetoresistive element, such that the middle insulating layer and the magnetoresistive element form a continuous layer;

wherein the lower insulating layer, the upper insulating layer, and the magnetoresistive element form a magnetic gap separating the upper shield layer from the lower shield layer, and wherein the upper insulating layer has a substantially uniform thickness, such that the magnetic gap has a substantially uniform thickness.

9. The thin-film magnetic head of claim 8 wherein the magnetic head is mounted in a rotating drum, such that when a magnetic tape slides relative to the drum, the thickness of the magnetic gap is constant relative to the sliding direction of the magnetic tape.

10. The thin-film magnetic head of claim 8, wherein the magnetoresistive element comprises:

a first soft magnetic film;

a second soft magnetic film; and a nonmagnetic film interposed between the first and second magnetic films.

11. The thin-film magnetic head of claim 8, wherein the magnetoresistive element comprises:

a free magnetic film;

a nonmagnetic film overlying the free magnetic film;

a fixed magnetic film overlying the nonmagnetic film; and an antiferromagnetic film overlying the fixed magnetic film.

12. A process for forming a thin-film magnetic head including a magnetoresistive element for reading out information as the magnetic head slides relative to a magnetic recording medium, the process comprising:

providing a slider body having a sliding surface;

forming a magnetic core on the sliding surface, wherein the magnetic core includes a magnetic gap having a lower insulating layer and an upper insulating layer and a magnetoresistive element therebetween, wherein bias layers reside adjacent to side surfaces of the magnetoresistive element, and wherein a middle insulating layer overlies the lower insulating layer, such that portions of the middle insulating layer reside on either side of the bias layers and form a continuous layer with the magnetoresistive element; and lapping the sliding surface of the slider and the magnetic core.

13. The process of claim 12, wherein lapping the sliding surface comprises lapping the sliding surface using a tin alloy lapping table.

14. The process of claim 12, wherein forming a magnetic core comprises:

providing a base having a lower shield layer formed thereon;

forming the lower insulating layer on the lower shield layer;

forming a magnetoresistive element layer on the lower insulating layer;

patterning the magnetoresistive element layer and removing portions of the magnetoresistive element layer to form first and second inclined edge surfaces;

forming bias regions adjacent to the first and second inclined edge surfaces;

forming the middle insulating layer on the lower insulating layer adjacent to the bias regions; and forming the upper insulating layer to overlie the magnetoresistive element layer, the bias regions and the middle insulating layer.

15. The process of claim 14, wherein forming the middle insulating layer comprises:

forming a resist pattern overlying the magnetoresistive element layer and the bias regions;

wherein exposed portions of the lower insulating layer reside in region not covered by the resist pattern;

depositing a layer of insulating material to overlie the resist pattern and the exposed portions of the lower insulating layer;

and removing the resist pattern and the portion of the insulating material overlying the resist pattern.

16. The process of claim 14, wherein forming the middle insulating layer comprises forming a layer of insulating material having a substantially uniform thickness.

* * * * *

UNITED STATES PATENT AND TRADEMARK OFFICE
CERTIFICATE OF CORRECTION

PATENT NO. : 6,741,430 B2
DATED : May 25, 2004
INVENTOR(S) : Katsuya Kikuiri

It is certified that error appears in the above-identified patent and that said Letters Patent is hereby corrected as shown below:

Column 16,
Line 5, immediately after "magnetoresistive element" insert -- , -- (comma).

Column 17,
Line 1, after "between the" delete "a".

Signed and Sealed this

Twenty-eighth Day of June, 2005

JON W. DUDAS
*Director of the United States Patent and Trademark Office*